(12) United States Patent
Lathrop et al.

(10) Patent No.: US 11,651,702 B2
(45) Date of Patent: May 16, 2023

(54) SYSTEMS AND METHODS FOR PREDICTION OF STUDENT OUTCOMES AND PROACTIVE INTERVENTION

(71) Applicant: Pearson Education, Inc., Bloomington, MN (US)

(72) Inventors: Quinn Lathrop, Denver, CO (US); David R. King, Erie, CO (US); Brett van de Sande, Tempe, AZ (US)

(73) Assignee: PEARSON EDUCATION, INC., Bloomington, MN (US)

( * ) Notice: Subject to any disclaimer, the term of this patent is extended or adjusted under 35 U.S.C. 154(b) by 789 days.

(21) Appl. No.: 16/554,159

(22) Filed: Aug. 28, 2019

(65) Prior Publication Data

US 2020/0074874 A1 Mar. 5, 2020

Related U.S. Application Data

(60) Provisional application No. 62/726,037, filed on Aug. 31, 2018.

(51) Int. Cl.
*G09B 7/04* (2006.01)
*G06N 3/08* (2023.01)
*G06N 20/20* (2019.01)
*G06F 18/214* (2023.01)

(52) U.S. Cl.
CPC ............ *G09B 7/04* (2013.01); *G06F 18/214* (2023.01); *G06N 3/08* (2013.01); *G06N 20/20* (2019.01)

(58) Field of Classification Search
CPC ...... G09B 7/04; G06K 9/6256; G06K 9/6217; G06N 3/08; G06N 20/20; G06N 5/003; G06N 7/005
See application file for complete search history.

(56) References Cited

U.S. PATENT DOCUMENTS

| 2017/0235848 A1* | 8/2017 | Van Dusen | G06N 5/02 |
| | | | 705/12 |
| 2020/0134759 A1* | 4/2020 | Refila | G06F 17/18 |
| 2021/0110294 A1* | 4/2021 | Elewitz | G06F 18/23213 |
| 2022/0180882 A1* | 6/2022 | Wang | G06N 3/088 |

OTHER PUBLICATIONS

Rollinson, Joseph, and Emma Brunskill. "From Predictive Models to Instructional Policies." International Educational Data Mining Society (2015). (Year: 2015).*

* cited by examiner

*Primary Examiner* — Bobbak Safaipour
(74) *Attorney, Agent, or Firm* — Quarles & Brady LLP

(57) ABSTRACT

Systems and methods of the present invention provide for one or more machine learning models configured to generate one or more student outcome predictions, such as whether a student will correctly respond to items of an assessment or will pass the assessment, based on monitored student activity and associated parameters. Inputs to the machine learning models may include outputs of other predictive models, such as an item response theory model and a short term prediction model. The machine learning models may output a student outcome prediction vector containing student outcome predictions for each uncompleted item of an assessment being delivered to a student in real-time. Remediation activities may be recommended to or automatically initiated for the student based on the student outcome predictions. A delivery order of the assessment may be modified based on the student outcome predictions.

19 Claims, 7 Drawing Sheets

SYSTEMS AND METHODS FOR PREDICTION OF STUDENT OUTCOMES AND PROACTIVE INTERVENTION

CROSS-REFERENCE TO RELATED APPLICATION

This application claims the benefit of priority from provisional application No. 62/726,037, titled AI-BASED METHODS FOR TARGETING STRUGGLING STUDENTS PRIOR TO FAILING HOMEWORK USING A BETWEEN-OBJECTIVE PREDICTION MODEL, the entire contents of which is incorporated herein by reference.

FIELD OF THE INVENTION

This disclosure relates to the field of systems and methods configured to implement one or more predictive models to process feature vector data related to a student and item parts of an assessment being delivered to the student, and to potentially provide proactive intervention to help the student based on one or more predictions output by the one or more predictive models.

BACKGROUND

A computer network or data network is a telecommunications network which allows computers to exchange data. In computer networks, networked computing devices exchange data with each other along network links (data connections). The connections between nodes are established using either cable media or wireless media.

Network computer devices that originate, route and terminate the data are called network nodes. Nodes can include hosts such as personal computers, phones, servers as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology and organizational intent. In most cases, communications protocols are layered on other more specific or more general communications protocols, except for the physical layer that directly deals with the transmission media.

SUMMARY OF THE INVENTION

In an example embodiment, a system may include a scoring and monitoring system configured to monitor student activity occurring at a client computer device to generate student activity data, the student activity corresponding to delivery of an assessment to a student, a data store server including at least one data store and being coupled to the scoring and monitoring system, and a model server coupled to the data store server. The data store server may receive the student activity data from the scoring and monitoring system and may store the student activity data in the at least the data store server. The model server may include a model processor configured to execute a first predictive model to generate model data based at least on the student activity data, generate a feature vector based on at least the student activity data and the model data, and process the feature vector by executing a second predictive model to generate a student outcome prediction that estimates whether the student will correctly respond to an item part of the assessment on a first attempt.

In some embodiments, the at least one data store may include an evaluation data store that stores evaluation data. The evaluation data may include the student activity data and historical student activity data associated with historical activity of the student and of other students. The at least one data store may further include an event data store that stores event data, the event data characterizing the evaluation data and being generated, at least in part, by the scoring and monitoring system based on the evaluation data. The at least one data store may further include a model data store that stores the model data generated by the first predictive model. The model data may be further generated based on the historical student activity data.

In some embodiments, the first predictive model may include an item response theory model. The model data may include an item part difficulty score for the item part of the assessment, a student ability score for the student, and a correct first try probability score that estimates the likelihood that the student will correctly respond to the item part on the first attempt based on the item part difficulty score and the student ability score.

In some embodiments, the model processor may be further configured to execute a short term prediction model to generate a short term prediction score by identifying a first order in which the student has responded to already-answered item parts of the assessment based on the historical student activity data, identifying grades for each of the already-answered item parts, identifying a group of students of the other students, each student of the group of students having responded to the already-answered item parts in the first order when taking the assessment, determining a first average of grades achieved by the group of students when first responding to the already-answered item parts, and generating the short term prediction score based on the first average.

In some embodiments, the event data may include a recent student response history score representing grades of responses submitted by the student within a predefined time window, a recent student learning aid usage score representing learning aid usage of the student within the predefined time window, a recent student time on task score representing an average time taken by the student to submit each of the responses within the predefined time window, and an average item part score representing a second average grade achieved by a subset of the other students during their respective first attempts at responding to the item part.

In some embodiments, the feature vector may include the item part difficulty score, the student ability score, the correct first try probability score, the short term prediction score, the recent student response history score, the recent student learning aid usage score, the recent student time on task score, and the average item part score.

In some embodiments, the second predictive model may be any of a neural network model, a random forest model, a support vector machine, or a logistic regression model.

In some embodiments, the system may include a content management server that receives the student outcome prediction from the model server and that is configured to perform a comparison of the student outcome prediction and at least one threshold and intervene in delivery of the assessment by sending an output to the client computer device.

In some embodiments, the output causes the client computer device to modify an order in which item parts of the assessment are delivered.

In some embodiments, the output causes the client computer device to interrupt the initiate a remediation activity selected from the group consisting of performing a remediation exercise, displaying a video lecture, and performing a prerequisite learning activity.

In an example embodiment, a system may include a data store server configured to store student activity data corresponding to delivery of an assessment to a student at a client device, a model server configured to execute at least one predictive model to generate model data based on the student activity data, to generate feature vectors based on the student activity data and the model data, and to execute a machine learning model to generate a student outcome prediction vector, and a content management server configured to determine that new student activity data is available at the data store, cause the model server to execute the machine learning model in response to determining that the new student activity data is available at the data store, and receive the student outcome prediction vector from the model server. The student outcome prediction vector may include at least one student outcome prediction that estimates a likelihood that the student will correctly respond to an item part of the assessment during a first attempt. The content management server may further be configured to analyze the student outcome prediction vector and, based on analyzing the student outcome prediction vector, intervene in the delivery of the assessment.

In some embodiments, to analyze the student outcome prediction vector, the content management server may be configured to determine a first number of positive student outcome predictions of the student outcome prediction vector by comparing each student outcome prediction of the student outcome prediction vector to a positive outcome threshold, determine a second number of negative student outcome predictions of the student outcome prediction vector by comparing each student outcome prediction of the student outcome prediction vector to a negative outcome threshold, perform a first comparison of the first number to a first threshold, and perform a second comparison of the second number to a second threshold.

In some embodiments, to analyze the student outcome prediction vector, the content management server may be further configured to determine, based on the second comparison, that the second number exceeds the second threshold, determine, based on the first comparison, that the first number exceeds the first threshold, and determine that automatic remediation is enabled for the student and the assessment.

In some embodiments, to intervene in the delivery of the assessment, the content management server may be configured to automatically cause an output to be sent to the client device, the output causing the client device to initiate a remediation activity, wherein the remediation activity interrupts delivery of the assessment.

In some embodiments, to analyze the student outcome prediction vector, the content management server is further configured to determine, based on the second comparison, that the second number exceeds the second threshold, and determine, based on the first comparison, that the first number does not exceed the first threshold.

In some embodiments, to intervene in the delivery of the assessment, the content management server is configured to identify an original delivery order of uncompleted item parts of the assessment, generate an updated delivery order of the uncompleted item parts in which a first subset of the uncompleted item parts are to be delivered before a second of the uncompleted item parts, the first subset of the uncompleted item parts being associated with the positive student outcome predictions, and the second subset of uncompleted item parts being associated with the negative student outcome predictions, send the updated delivery order to the client device to replace the original delivery order.

In an example embodiment, a method may include steps of determining, by a content management server, that new student activity data is available at a data store, the new student activity data corresponding to delivery of an assessment to a student at a client device, causing, by the content management server, a model server to generate at least one feature vector in response to determining that the new student activity data is available, causing, by the content management server, the model server to execute a machine learning model to process the at least one feature vector to produce a student outcome prediction vector, receiving, by the content management server, the student outcome prediction vector from the model server, the student outcome prediction vector comprising at least one student outcome prediction that estimates a likelihood that the student will correctly respond to an item part of the assessment during an initial attempt, analyzing, by the content management server, the student outcome prediction vector, and intervening, by the content management server, in the delivery of the assessment in response to analyzing the student outcome prediction vector.

In some embodiments, causing the model server to generate the at least one feature vector may include steps of causing the model server to execute an item response theory model to generate item response theory data, causing the model server to execute an short term prediction model to generate a short term prediction score, and causing the model server to retrieve event data from an event data store of the data store server. The at least one feature vector may include the item response theory data, the short term prediction score, and the event data.

In some embodiments, analyzing the student outcome prediction vector may include steps of determining a first number of positive student outcome predictions of the student outcome prediction vector by comparing each student outcome prediction of the student outcome prediction vector to a positive outcome threshold, determining a second number of negative student outcome predictions of the student outcome prediction vector by comparing each student outcome prediction of the student outcome prediction vector to a negative outcome threshold, performing a first comparison of the first number to a first threshold, performing a second comparison of the second number to a second threshold, determining, based on the second comparison, that the second number exceeds the second threshold, determining, based on the first comparison, that the first number exceeds the first threshold, and determining that automatic remediation is enabled for the student and the assessment. Intervening in the delivery of the assessment may include automatically causing an output to be sent to the client device, the output causing the client device to initiate a remediation activity. The remediation activity may interrupt delivery of the assessment.

In some embodiments, analyzing the student outcome prediction vector may include steps of determining a first number of positive student outcome predictions of the student outcome prediction vector by comparing each student outcome prediction of the student outcome prediction vector to a positive outcome threshold, determining a second number of negative student outcome predictions of the student outcome prediction vector by comparing each student outcome prediction of the student outcome prediction vector to a negative outcome threshold, performing a first comparison of the first number to a first threshold, performing a second comparison of the second number to a second threshold, determining, based on the second comparison, that the second number exceeds the second threshold, and determining, based on the first comparison, that the first number does not exceed the first threshold.

In some embodiments, intervening in the delivery of the assessment may include identifying an original delivery order of uncompleted item parts of the assessment, generating an updated delivery order of the uncompleted item parts in which a first subset of the uncompleted item parts are to be delivered before a second of the uncompleted item parts, the first subset of the uncompleted item parts being associated with the positive student outcome predictions, and the second subset of uncompleted item parts being associated with the negative student outcome predictions, and sending the updated delivery order to the client device to replace the original delivery order.

The above features and advantages of the present invention will be better understood from the following detailed description taken in conjunction with the accompanying drawings.

DETAILED DESCRIPTION

Figure 1:
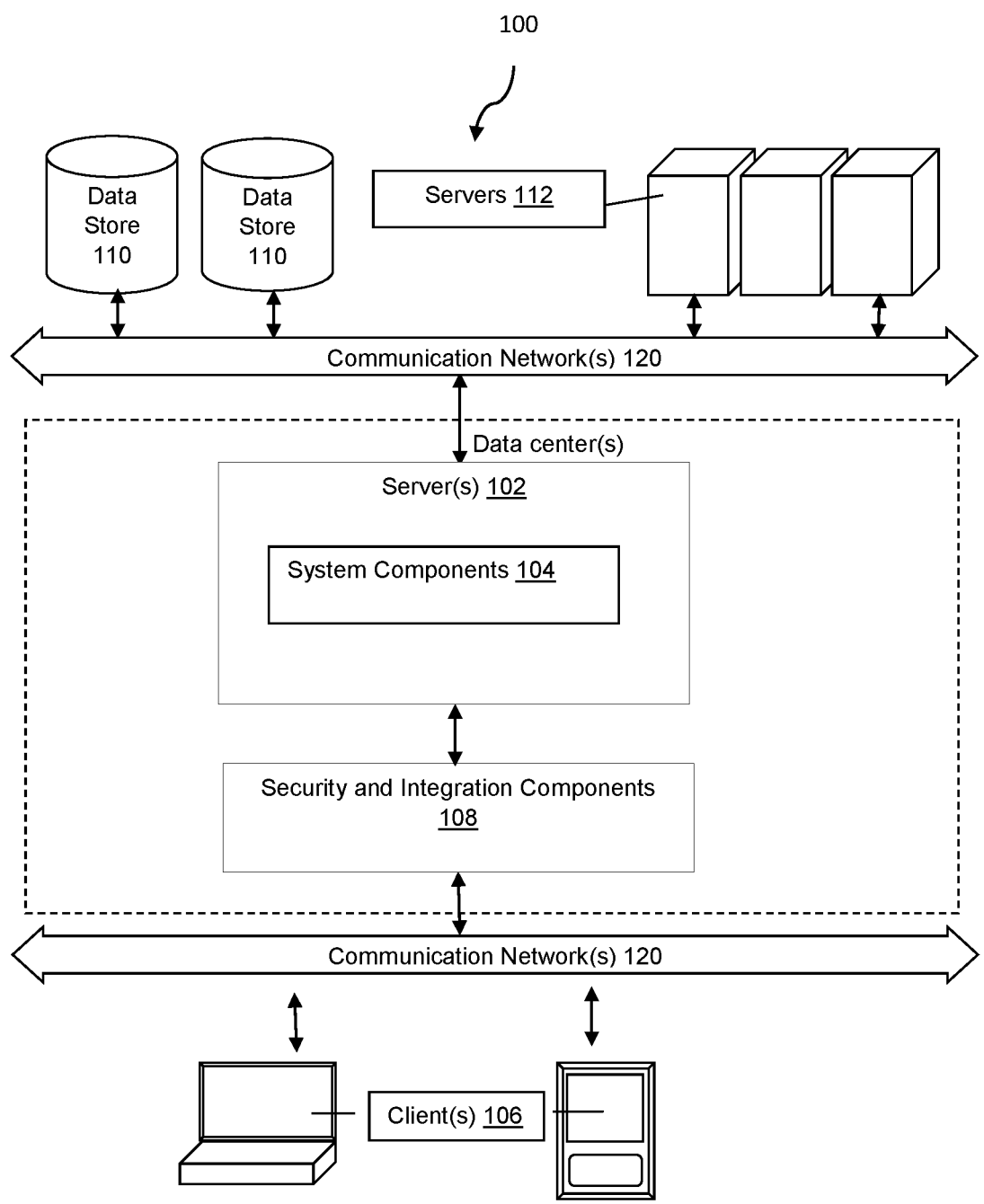
FIG. 1 illustrates a system level block diagram showing data stores, data centers, servers, and clients of a distributed computing environment, in accordance with an embodiment.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Network

FIG. 1 illustrates a non-limiting example distributed computing environment 100 (sometimes referred to herein as content distribution network 100 or content distribution system 100), which includes one or more computer server computing devices 102, one or more client computing devices 106 (sometimes referred herein to as clients 106 or user devices 106), and other components that may implement certain embodiments and features described herein. Other devices, such as specialized sensor devices, etc., may interact with client 106 and/or server 102. The server 102, client 106, or any other devices may be configured to implement a client-server model or any other distributed computing architecture.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Servers/Clients

Figure 2:
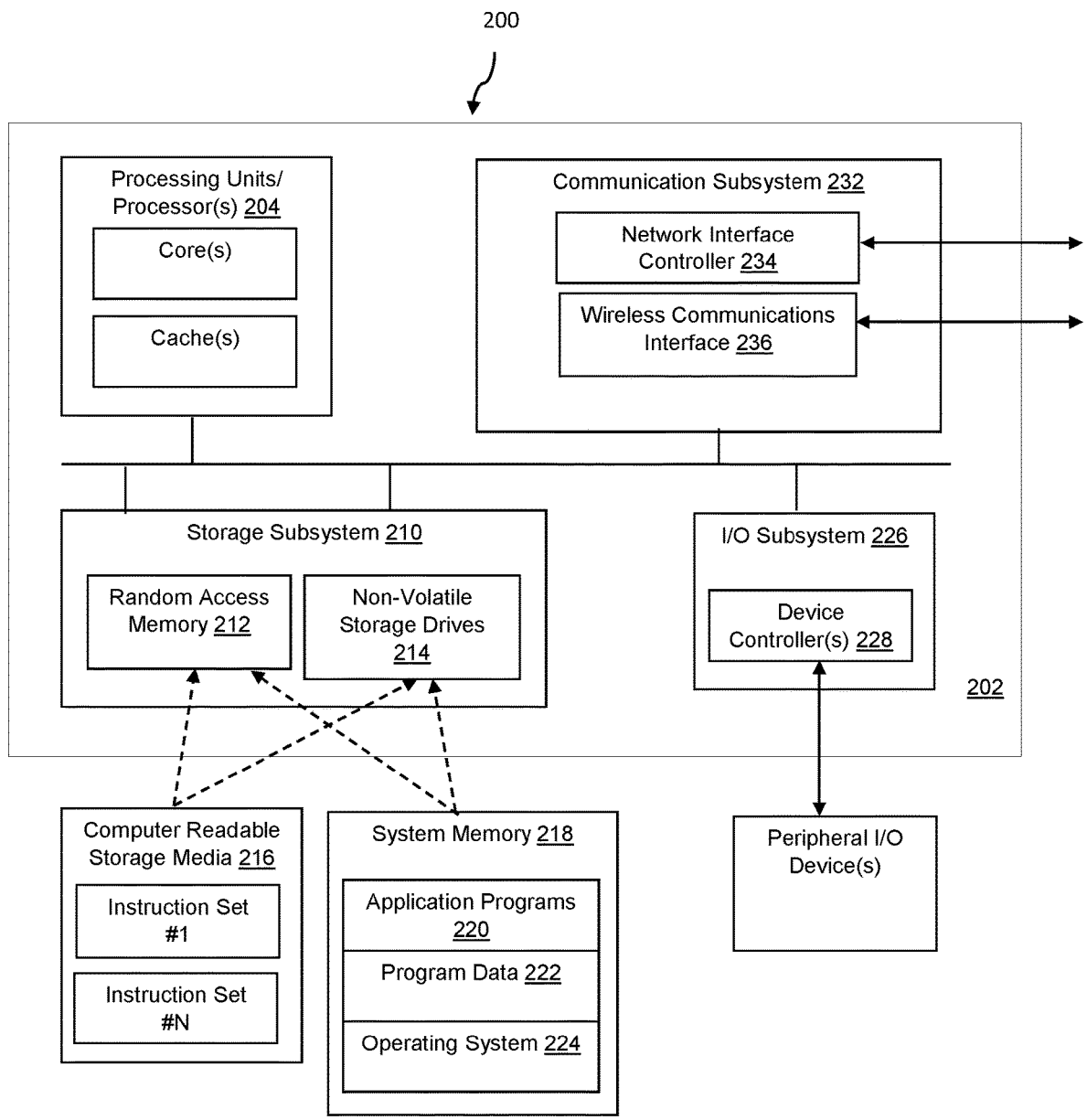
FIG. 2 illustrates a system level block diagram showing physical and logical components of a special-purpose computer device within a distributed computing environment, in accordance with an embodiment.

The embodiments shown in FIGS. 1-2 are thus one example of a distributed computing system and is not intended to be limiting. The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems and content distribution networks (e.g., content distribution network 100). Server 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

Security

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users, As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Data Stores (Databases)

Content distribution network 100 also may include one or more data stores 110, possibly including and/or residing on one or more back-end servers 112 (sometimes referred to as data store servers 112), operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

Computer System

With reference now to FIG. 2, a block diagram of an illustrative computer system is shown. The system 200 may correspond to any of the computing devices or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

Processors

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code, and may maintain multiple concurrently executing programs or processes. Processor(s) 204 may also include one or more specialized processors, (e.g., digital signal processors (DSPs), outboard, graphics application-specific, and/or other processors).

Buses

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

Input/Output

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), etc.

Input

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

Output

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Memory or Storage Media

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Computer Readable Storage Media

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communication Interface

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

Input Output Streams Etc.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

Connect Components to System

The various physical components of the communications subsystem 232 may be detachable components coupled to the computer system 200 via a computer network, a FireWire® bus, or the like, and/or may be physically integrated onto a motherboard of the computer system 200. Communications subsystem 232 also may be implemented in whole or in part by software.

Other Variations

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 3:
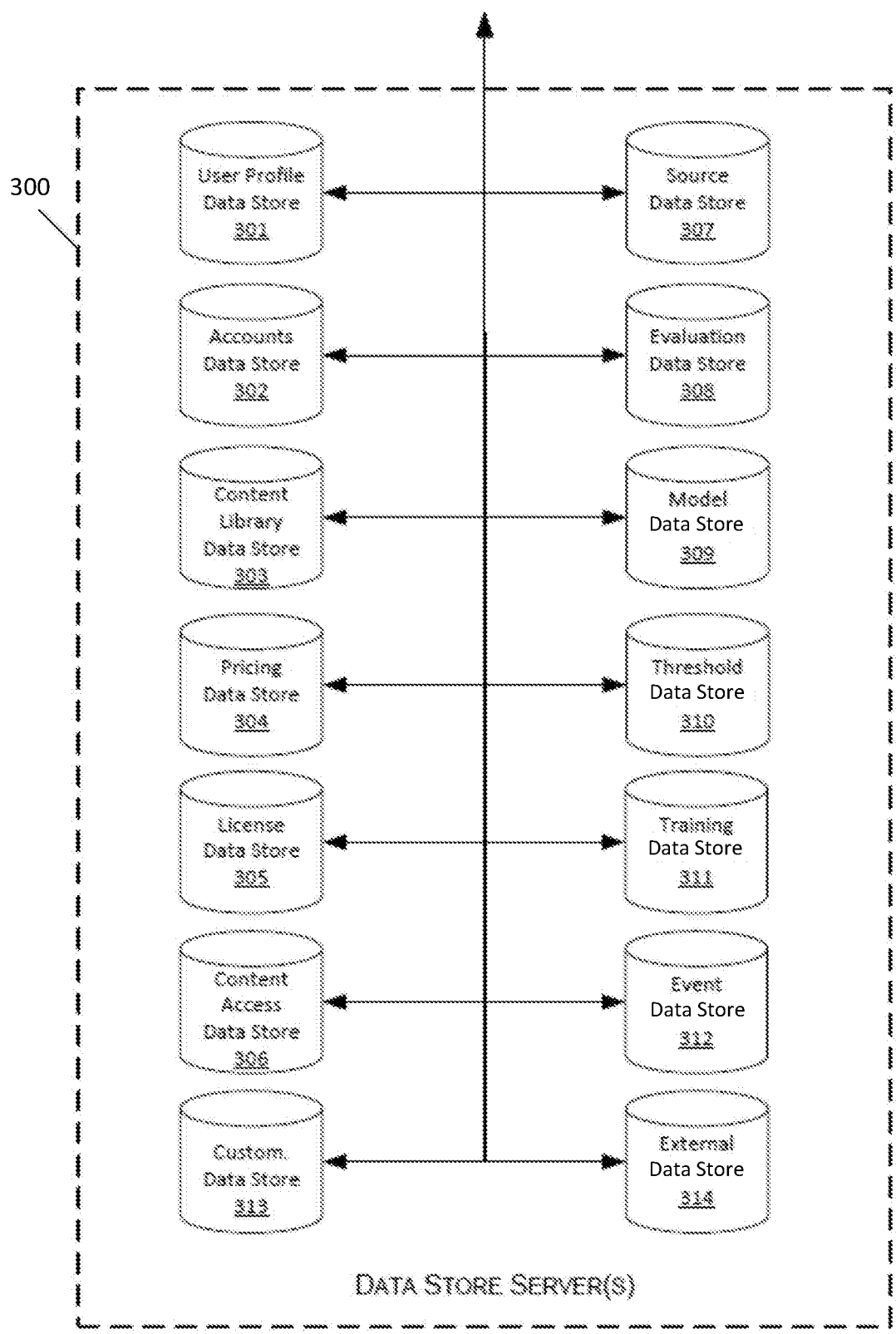
FIG. 3 illustrates a data store server that includes multiple data stores, each hosting data related to one or more aspects of an electronic learning system/environment, in accordance with an embodiment.

With reference to FIG. 3, an illustrative set of data stores and/or data store servers 300 is shown, (e.g., which may correspond to the data store servers 112 of the content distribution network 100 discussed above in FIG. 1). One or more individual data stores 301-314 (e.g., which may correspond to data stores 110 of FIG. 1) may reside in storage on the one or more data store servers 300 (e.g., which may include a single computer server, a single server farm or cluster of computer servers) under the control of a single entity. In some embodiments, the data stores 301-314 may reside on separate servers 300 operated by different entities and/or at remote locations. In some embodiments, data stores 301-314 may be accessed by a content management server (e.g., content management server 102 of FIG. 1) and/or other devices and servers of a content distribution network (e.g., content distribution network 100 of FIG. 1) that includes the data store server(s) 300. Access to one or more of the data stores 301-314 may be limited or denied based on the processes, user credentials, and/or devices attempting to interact with the data store.

The paragraphs below describe examples of specific data stores that may be implemented within some embodiments of a content distribution network. It should be understood that the below descriptions of data stores 301-314, including their functionality and types of data stored therein, are illustrative and non-limiting. Data store server architecture, design, and the execution of specific data stores 301-314 may depend on the context, size, and functional requirements of a content distribution network. For example, in content distribution systems used for professional training and educational purposes, separate databases or file-based storage systems may be implemented in data store server(s) 300 to store trainee and/or student data, trainer and/or professor data, training module data and content descriptions, training results, evaluation data, and the like. In contrast, in content distribution systems used for media distribution from content providers to subscribers, separate data stores may be implemented in data store server(s) 300 to store listings of available content titles and descriptions, content title usage statistics, subscriber profiles, account data, payment data, network usage statistics, etc.

A user profile data store 301, sometimes referred to herein as a user profile database 301, may include information, also referred to herein as user metadata, relating to the end users within the content distribution network. This information may include user characteristics such as the user names, access credentials (e.g., logins and passwords), user preferences, and information relating to any previous user interactions within the content distribution network (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

In some embodiments, the user profile data store 301 can include information, such as a risk status, relating to a user's risk level. This risk information can characterize a degree of user risk; a user risk categorization such as, for example, high risk, intermediate risk, and/or low risk; sources of user risk, or the like. In some embodiments, this risk information can be associated with one or several interventions or remedial actions to address the user risk.

The user profile data store 301 can include user metadata relating to a user's status, location, or the like. This information can identify, for example, a device a user is using, the location of that device, or the like. In some embodiments, this information can be generated based on any location detection technology including, for example, a navigation system, or the like. The user profile data store 301 can include user metadata identifying communication information associated with users identified in the user profile data store 301. This information can, for example, identify one or several devices used or controlled by the users, user telephone numbers, user email addresses, communication preferences, or the like.

Information relating to the user's status can identify, for example, logged-in status information that can indicate whether the user is presently logged-in to the content distribution network and/or whether the log-in-is active. In some embodiments, the information relating to the user's status can identify whether the user is currently accessing content and/or participating in an activity from the content distribution network.

In some embodiments, information relating to the user's status can identify, for example, one or several attributes of the user's interaction with the content distribution network, and/or content distributed by the content distribution network. This can include data identifying the user's interactions with the content distribution network, the content consumed by the user through the content distribution network, or the like. In some embodiments, this can include data identifying the type of information accessed through the content distribution network and/or the type of activity performed by the user via the content distribution network, the lapsed time since the last time the user accessed content and/or participated in an activity from the content distribution network, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices, or the like.

In some embodiments in which the one or several end users are individuals, and specifically are students, the user profile data store 301 can further include user metadata relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content distribution network.

The user profile data store 301 can include user metadata relating to one or several student learning preferences. In some embodiments, for example, the user, also referred to herein as the student or the student-user may have one or several preferred learning styles, one or several most effective learning styles, and/or the like. In some embodiments, the student's learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content distribution network.

In some embodiments, the user profile data store 301 can further include user metadata identifying one or several user skill levels. In some embodiments, these one or several user skill levels can identify a skill level determined based on past performance by the user interacting with the content distribution network, and in some embodiments, these one or several user skill levels can identify a predicted skill level determined based on past performance by the user interacting with the content distribution network and one or several predictive models.

The user profile data store 301 can further include user metadata relating to one or several teachers and/or instructors who are responsible for organizing, presenting, and/or managing the presentation of information to the student. In some embodiments, user profile data store 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile data store 301 can further include information indicating past evaluations and/or evaluation reports received by the teacher. In some embodiments, the user profile data store 301 can further include information relating to improvement suggestions received by the teacher, training received by the teacher, continuing education received by the teacher, and/or the like. In some embodiments, this information can be stored in a tier of memory that is not the fastest memory in the content distribution network.

An accounts data store 302, also referred to herein as an accounts data store 302, may generate and store account data for different users in various roles within the content distribution network. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, sometimes referred to herein as a content library database 303, may include information describing the individual content items (or content resources or data packets) available via the content distribution network. In some embodiments, these data packets in the content library data store 303 can be linked to form an object network. In some embodiments, these data packets can be linked in the object network according to one or several sequential relationship which can be, in some embodiments, prerequisite relationships that can, for example, identify the relative hierarchy and/or difficulty of the data objects. In some embodiments, this hierarchy of data objects can be generated by the content distribution network according to user experience with the object network, and in some embodiments, this hierarchy of data objects can be generated based on one or several existing and/or external hierarchies such as, for example, a syllabus, a table of contents, or the like. In some embodiments, for example, the object network can correspond to a syllabus such that content for the syllabus is embodied in the object network.

In some embodiments, the content library data store 303 can comprise a syllabus, a schedule, or the like. In some embodiments, the syllabus or schedule can identify one or several tasks and/or events relevant to the user. In some embodiments, for example, when the user is a member of a group such as a section or a class, these tasks and/or events relevant to the user can identify one or several assignments, quizzes, exams, or the like.

In some embodiments, the content library data store 303 may include metadata, properties, and other characteristics associated with the content resources stored in a content management server (e.g., of the content management server(s) 102 of FIG. 1). Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the content library data store 303 may be configured to allow updating of content metadata or properties, and to allow the addition and/or removal of information relating to the content resources. For example, content relationships may be implemented as graph structures, which may be stored in the content library data store 303 or in an additional store for use by selection algorithms along with the other metadata.

In some embodiments, the content library data store 303 can contain information used in evaluating responses received from users. In some embodiments, for example, a user can receive content from the content distribution network and can, subsequent to receiving that content, provide a response to the received content. In some embodiments, for example, the received content can comprise one or several questions, prompts, or the like, and the response to the received content can comprise an answer to those one or several questions, prompts, or the like. In some embodiments, information, referred to herein as "comparative data," from the content library data store 303 can be used to determine whether the responses are the correct and/or desired responses.

In some embodiments, the content library data store 303 and/or the user profile data store 301 can comprise an aggregation network, also referred to herein as a content network or content aggregation network. The aggregation network can comprise a plurality of content aggregations that can be linked together by, for example: creation by common user; relation to a common subject, topic, skill, or the like; creation from a common set of source material such as source data packets; or the like. In some embodiments, the content aggregation can comprise a grouping of content comprising the presentation portion that can be provided to the user in the form of, for example, a flash card and an extraction portion that can comprise the desired response to the presentation portion such as for example, an answer to a flash card. In some embodiments, one or several content aggregations can be generated by the content distribution network and can be related to one or several data packets that can be, for example, organized in object network. In some embodiments, the one or several content aggregations can be each created from content stored in one or several of the data packets.

In some embodiments, the content aggregations located in the content library data store 303 and/or the user profile data store 301 can be associated with a user-creator of those content aggregations. In some embodiments, access to content aggregations can vary based on, for example, whether a user created the content aggregations. In some embodiments, the content library data store 303 and/or the user profile data store 301 can comprise a database of content aggregations associated with a specific user, and in some embodiments, the content library data store 303 and/or the user profile data store 301 can comprise a plurality of databases of content aggregations that are each associated with a specific user. In some embodiments, these databases of content aggregations can include content aggregations created by their specific user and, in some embodiments, these databases of content aggregations can further include content aggregations selected for inclusion by their specific user and/or a supervisor of that specific user. In some embodiments, these content aggregations can be arranged and/or linked in a hierarchical relationship similar to the data packets in the object network and/or linked to the object network in the object network or the tasks or skills associated with the data packets in the object network or the syllabus or schedule.

In some embodiments, the content aggregation network, and the content aggregations forming the content aggregation network can be organized according to the object network and/or the hierarchical relationships embodied in the object network. In some embodiments, the content aggregation network, and/or the content aggregations forming the content aggregation network can be organized according to one or several tasks identified in the syllabus, schedule or the like.

A pricing data store 304 may include pricing information and/or pricing structures for determining payment amounts for providing access to the content distribution network and/or the individual content resources within the network. In some cases, pricing may be determined based on a user's access to the content distribution network, for example, a time-based subscription fee, or pricing based on network usage. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network. For example, the license data store 305 may identify licenses and licensing terms for individual content resources and/or compilations of content resources in the content server, the rights holders for the content resources, and/or common or large-scale right holder information such as contact information for rights holders of content not included in the content server.

A content access data store 306 may include access rights and security information for the content distribution network and specific content resources. For example, the content access data store 306 may include login information (e.g., user identifiers, logins, passwords, etc.) that can be verified during user login attempts to the network. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network. In some embodiments, the evaluation data store 308 may contain, for example, the analysis criteria and the analysis guidelines for evaluating users (e.g., trainees/students, gaming users, media content consumers, etc.) and/or for evaluating the content resources in the network. The evaluation data store 308 also may include information relating to evaluation processing tasks, for example, the identification of users and user devices (e.g., client devices 106 of FIG. 1) included in or coupled to the content distribution network that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like. For example, the evaluation data store 308 may include a response history of each of a number of students, which, for a given student, may include one or more of: each response submitted by the student to item parts of assessments, a grade for each response (e.g., correct or incorrect), and, for each item part, whether and/or how many relevant hints and/or other learning aids were used by the student prior to correctly responding to the item part, how long it took the student to correctly respond to an item part from the time that the item part was presented to the student (sometimes considered to be equivalent to "student time on task"), how many attempts the student made at responding to an item part before correctly responding to the item part, and whether the student correctly responded to an item part on their first attempt. The evaluation data of the evaluation data store 412 may further include statistical information characterizing a given item part, such as: how many attempts on average were made by all students who submitted responses to a given item part, and a first correct try percentage defining the percentage of students who correctly responded to a given item part on their first attempt.

A model data store 309, also referred to herein as a model data store 309, can store information relating to one or several complex models and one or several simple models. For example, the complex model(s) may include machine-learning algorithms, classifiers, predictive models, and/or the like. The predictive models can be, for example, statistical models. The simple models may include logistic models, IRT models, and/or short term prediction models. In some embodiments, the machine-learning algorithms or processes can include one or several classifiers such as a linear classifier. For example, the machine-learning algorithms can include at least one of: a Random Forest algorithm; an Artificial Neural Network; an AdaBoost algorithm; a Naïve Bayes algorithm; Boosting Tree, and a Support Vector Machine.

In some embodiments these machine-learning algorithms and/or models can include one or several evidence models, risk models, skill models, or the like. In some embodiments, an evidence model can be a mathematically-based statistical model. The evidence model can be based on, for example, Item Response Theory (IRT), Bayesian Network (Bayes net), Performance Factor Analysis (PFA), or the like. The evidence model can, in some embodiments, be customizable to a user and/or to one or several content items. Specifically, one or several inputs relating to the user and/or to one or several content items can be inserted into the evidence model. These inputs can include, for example, one or several measures of user skill level, one or several measures of content item difficulty and/or skill level, or the like. The customized evidence model can then be used to predict the likelihood of the user providing desired or undesired responses to one or several of the content items.

In some embodiments, the risk models can include one or several models that can be used to calculate one or several model function values. In some embodiments, these one or several model function values can be used to calculate a risk probability, which risk probability can characterize the risk of a user such as a student-user failing to achieve a desired outcome such as, for example, failure to correctly respond to one or several assessment item parts, failure to achieve a desired level of completion of a program, for example in a pre-defined time period, failure to achieve a desired learning outcome, or the like. In some embodiments, the risk probability can identify the risk of the student-user failing to complete 60% of the program.

The model functions can comprise a variety of types of models and/or functions. In some embodiments, each of the model functions outputs a function value that can be used in calculating a risk probability. This function value can be calculated by performing one or several mathematical operations on one or several values indicative of one or several user attributes and/or user parameters, also referred to herein as program status parameters. In some embodiments, each of the model functions can use the same program status parameters, and in some embodiments, the model functions can use different program status parameters.

In some embodiments, a skill model can comprise a statistical model identifying a predictive skill level of one or several students. For example, the statistical model may include a 1 parameter (1PL) or 2 parameter (2PL) IRT model, which may be applied to determine student ability/skill level (e.g., in the context of a particular textbook, subject, or educational program; based on the student's performance on assessment item parts included in that textbook, subject, or educational program), to determine difficulty of an item part of an assessment (e.g., quantification of how difficult it is for students to correctly respond to a problem or "item part" of an assessment, based on historical data defining overall student performance in responding to that item part), and to generate a prediction of how likely the student is to correctly respond to a given item part on their first attempt (sometimes referred to herein as "correct first try probability" or "correct first response probability"). It should be understood that in some embodiments, an item will have only a single answerable part, in which case the item part of the item is equivalent to the item itself. In other embodiments, an item will have multiple answerable parts, in which case each answerable part of the item may be considered to correspond to a different item part of that item.

In some embodiments, this statistical model can identify a single skill level of a student and/or a range of possible skill levels of a student. In some embodiments, this statistical model can identify a skill level of a student-user and an error value or error range associated with that skill level. In some embodiments, the error value can be associated with a confidence interval determined based on a confidence level. Thus, in some embodiments, as the number of student interactions with the content distribution network increases, the confidence level can increase and the error value can decrease such that the range identified by the error value about the predicted skill level is smaller.

In some embodiments, the model data store 309 can include a plurality of learning algorithms, classifiers, and/or models and can include information identifying features used by the plurality of learning algorithms, classifiers, and/or models in generating one or several predictions such as, for example, a risk prediction. In some embodiments, for example, some or all of the plurality of learning algorithms, classifiers, and/or models can use different features in generating one or several predictions. These features can be identified in the model data store 309 in association with the plurality of learning algorithms, classifiers, and/or models. In some embodiments, the model data store 309 can further include information identifying a format and/or form for the features to be in to allow inputting into the associated one or several of the plurality of learning algorithms, classifiers, and/or models (e.g., as a feature vector or group of feature vectors).

A threshold data store 310, sometimes referred to herein as threshold database 310, can store one or several threshold values. These one or several threshold values can delineate between states or conditions. In one exemplary embodiment, for example, a threshold value can delineate between an acceptable user performance and an unacceptable user performance, between content appropriate for a user and content that is inappropriate for a user, between risk levels, or the like.

A training data store 311, also referred to herein as a training database 311 can include training data used in training one or several of the plurality of learning algorithms, classifiers, and/or models. This can include, for example, one or several sets of training data and/or one or several sets of test data.

A event data store 312, sometimes referred to herein as a fact data store 312 or a feature data store 312 can include information identifying one or several interactions between the user and the content distribution network and any features, including first-level features or second-level features, generated therefrom. In some embodiments, the event data store 312 can include instructions and/or computer code that when executed causes the generation of one or several features including one or several first-level features and/or one or several second-level features. The event data store 312 can be organized into a plurality of sub-databases. In some embodiments, these can include an interaction sub-database that can include interactions between one or several users and the content distribution network. In some embodiments, this interaction sub-database can include divisions such that each user's interactions with the content distribution network are distinctly stored within the interaction sub-database. The event data store 312 can include a generated feature sub-database, which can include a generated first-level feature sub-database and/or a generated second-level feature sub-database.

The event data store 312 can further include a feature creation sub-database, which can include instructions for the creation of one or several features (e.g., based, at least in part, on response history data retrieved from the evaluation data store 308). For a given student, the one or several features can include, for example, a Hurst coefficient; average correct first try percent; an average score (which can include an average homework score and/or an average test score); an average item part score; a number of attempted item parts; an average number of attempted item parts; an average number of attempts per item part; a recent student learning aid usage score; a recent student time on task score; a recent student response history score; and an aggregation parameter such as, for example, one or several course level aggregations. In some embodiments, these features can be calculated with data collected within a window, which window can be a temporally bounded window, or a window bounded by a number of received response. In such an embodiment, for example, the window can be a sliding window, also referred to herein as a sliding temporal window that can include information relating to some or all of one or several users' interaction with the content distribution network during a designated time period such as, for example, a 1 week time period, a ten day time period, a two week time period, a three week time period, a four week time period, a six week time period, a twelve week time period, or any other or intermediate period of time.

For example, the recent student response history score may be an average of the scores of all student responses submitted within a "recent" temporal window (e.g., the past 10 days) to "relevant" item parts (i.e., item parts included in a specified textbook, subject and/or educational program). For example, the recent student learning aid usage score may be an average of the number of hints or other learning aids used by the student on each relevant item part responded to by the student within the "recent" temporal window. For example, the recent student time on task data store may be an average of the time spent by the student to correctly answer, individually, each relevant item part within the recent temporal window.

In some embodiments, the Hurst coefficient can be a measure of instability in responses received from a user, and specifically a measure of randomness in correct/incorrect responses to one or several questions. The Hurst coefficient can be calculated across a window of data, which window can be limited to a specified time period and/or to a specified number of response.

The average correct on first try percent (CFT %) can be a value indicating the average percent of questions to which the student-user submitted a correct response on a first try. The CFT % can be an indicator of changes to correctness stability. In some embodiments, this feature can be updated with each additional response received from the student-user. In some embodiments, the average correct on first try percent can be calculated by dividing the number of response that were correct on the first try by the number of questions for which responses were received. In some embodiments, the CFT % can be stored as a percent, or as a normalized value between 0 and 1.

The average score which can include an average homework score and/or an average test score can be the average score received by the user on, for example, homework and/or tests within the window. The average item part score can identify the average score received by the user on different problem item parts. In some embodiments, for example, a problem can include multiple item parts, each of which can be independent evaluated. The average item part score can be, for example, the average number of points received for an item part and/or a percent indicating the average percent of points received per item part. In some embodiments, the number of attempted item parts can be a count of the number of total attempted item parts of items, and the average number of attempted item parts can be the average number of attempted item parts per item. In some embodiments, the average number of attempts per item part can be the average number of attempts for each item part before the user quits further attempts or correctly responds to the item part. In some embodiments, the aggregation parameter can include a course level average such as, for example, an average percent correct across all students within a course, and the aggregation parameter can include one or several course level aggregations which can be a delta value indicating the difference between a feature calculated for an individual and a similar feature calculated for the course.

A customization data store 313 can include information relating to one or several customizations. The customization data store 313 can contain one or several configuration profiles that can identify one or several user attributes and a customization associated with each of those one or several user attributes. In some embodiments, the customization identifies a sub-set of potential features for use in generating a risk prediction, and thus can specify a change to features used in generating a risk prediction. The customization data store 313 can include customizations specific to a single user or to a group of users sharing a common attribute. In some embodiments, the customizations within the customization data store 313 can modify the machine-learning algorithm used in generating a risk prediction. In some embodiments this can include selecting a specific one or several machine-learning algorithms or classifiers that is associated with a unique set of features specified by the customization. In some embodiments, the identification of a customization for use in generating a risk prediction is determined according to a portion of metadata that is non-unique to a user and is unique to a set of users sharing at least one common attribute.

In addition to the illustrative data stores described above, server(s) 300 (e.g., data store servers, file-based storage servers, etc.) may include one or more external data aggregators. Such external data aggregators may include third-party data sources accessible to the content management network, but not maintained by the content management network. The external data aggregators may include any electronic information source relating to the users, content resources, or applications of the content distribution network. For example, the external data aggregators may be third-party data stores containing demographic data, education-related data, consumer sales data, health-related data, and the like. Illustrative external data aggregators may include, for example, social networking web servers, public records data stores, learning management systems, educational institution servers, business servers, consumer sales data stores, medical record data stores, etc. Data retrieved from various external data aggregators may be used to verify and update user account information, suggest user content, and perform user and content evaluations. Data retrieved by these external data aggregators may be stored in the external data store 314.

Figure 4:
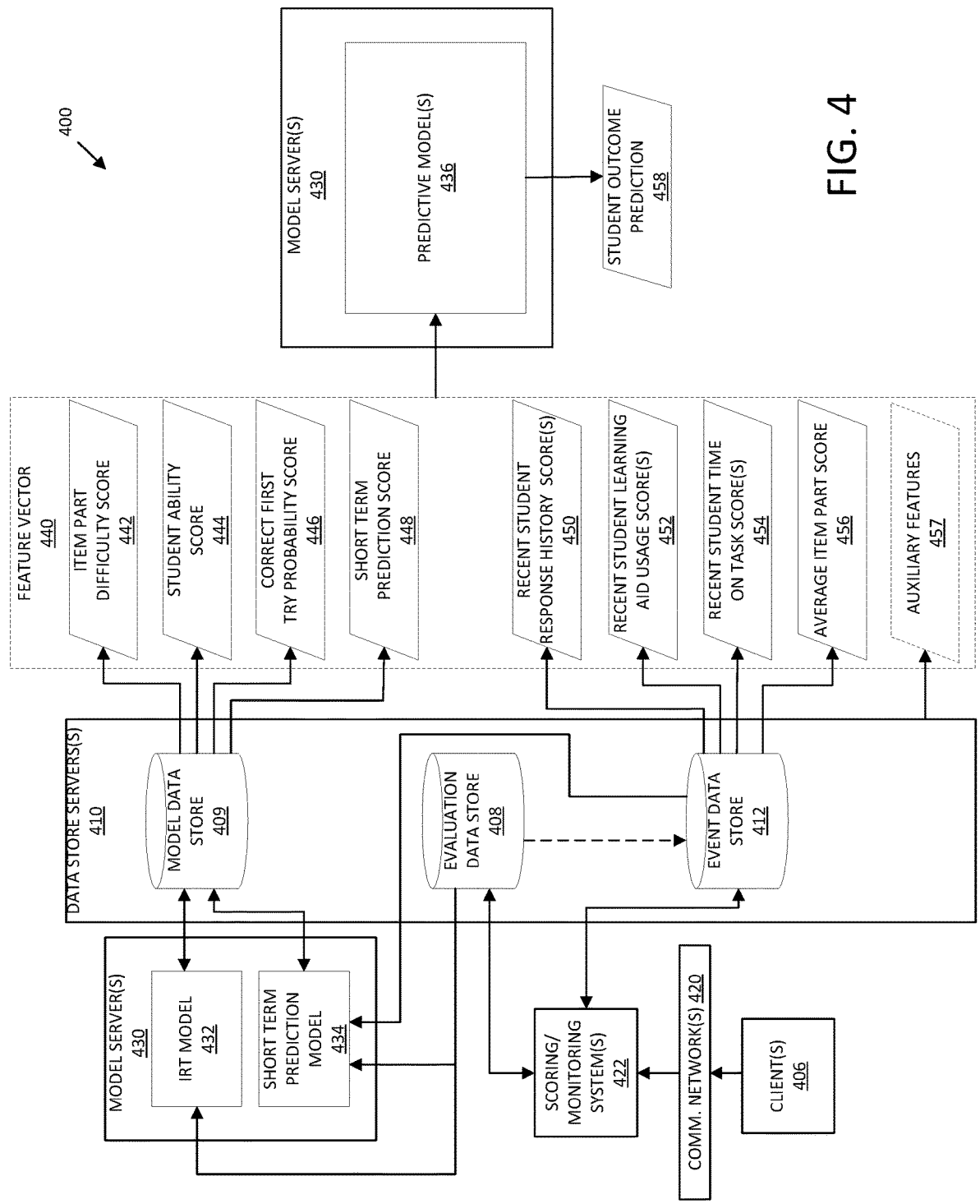
FIG. 4 illustrates a computing environment in which data related to a student and an assessment being taken by the student are retrieved from one or more data store servers, and processed as a feature vector by one or more predictive models to generate a student outcome prediction, in accordance with an embodiment.

FIG. 4 shows an illustrative system 400 by which features 442-457 may be extracted from data stores of one or more data store servers 410 (e.g., data store server 300 of FIG. 3). The system 400 includes one or more clients 406 (e.g., clients 106, FIG. 1), one or more communication networks 420 (e.g., communication network(s) 120 of FIG. 1), the data store servers 410, one or more scoring and/or monitoring systems 422, and one or more model servers 430. The clients 406 may be communicatively coupled to the scoring/monitoring systems 422 via the communication network(s) 420. In some embodiments, some or all of the clients 406, the scoring/monitoring systems 422, the data store servers 410, and the model servers 430 may be communicatively coupled to one another via the communication network(s) 420, though connections between some of these devices/systems are shown as being direct in the present example. The data store servers 410 may include a model data store 409, an evaluation data store 408, and an event data store 412. The model servers 430 may store (e.g., one or more memory devices of the model servers 430) and/or execute (e.g., via one or more processors of the model servers 430) an item response theory (IRT) model 432, a short term prediction model 434, and one or more predictive models 436. In some embodiments, model definitions may be stored on the model data store 409 and retrieved by the model servers 430 when executing the IRT model 432, the short term prediction model 434, and/or the predictive model(s) 436. It should be understood that the IRT model 432 and the short term prediction model 434 may generally be considered "predictive models".

In one aspect, the system 400 may monitor and record student activity occurring at the clients 406. A student may progress through content (e.g., an assessment or activity, which may be part of a particular course or "title" in which the student is enrolled) using one of the clients 406. The scoring/monitoring system(s) 422 may monitor activity of the student as they progress through the content, and may generate student activity data based on this monitoring. The student activity data be categorized as evaluation data, and may be related to the student and/or the assessment being delivered to the student. For example, activity of the student performed at the clients 406, monitored by the scoring/monitoring systems 422, and included in the student activity data may include: responses submitted by the student to an assessment or activity (e.g., to item parts included in an assessment or activity), how long the student takes to submit a response to an item part of an assessment (e.g., which may be calculated by determining a difference between a first time stamp generated when the student was first presented with the assessment item part at the client 406, and a second time stamp generated at the time at which a correct response to the assessment item part was submitted by the student), how many times the student utilized learning aids (if any) when responding to an item part of an assessment, and/or types of learning aids used (if any) when responding to an item part of an assessment. Student activity data generated by the scoring/monitoring systems 422 may be stored on the evaluation data store 408.

The student activity data may be analyzed, along with historical student activity data (e.g., the response history of the student) stored in the evaluation data store 408, by the scoring/monitoring system 422 to produce event data. For example, the scoring/monitoring system 422 may generate grades (i.e., scores) for the student's responses to individual assessment item parts, may generate a Hurst coefficient (e.g., indicative of a measure of instability in responses received from a user, and specifically a measure of randomness in correct/incorrect responses to one or several item parts) based on grades generated for the student's responses, a number of item parts attempted by the student, the average correct first try percent of the student (e.g., calculated as a ratio of the number of item parts responded to correctly by the student to the total number of responses submitted by the student to item parts), an average homework score for the student (e.g., average grades the student has received on homework activities), an average test score for the student (e.g., average grades the student has received on tests or summative assessments), an average number of attempts (e.g., including, potentially, both correct and incorrect responses) per item part submitted by the student, a recent student response history score, and an aggregation parameter such as, for example, one or several course level aggregations. Event data generated by the scoring/monitoring systems 422 may be stored in the event data store 412. In some embodiments, event data generation may take place at the data store servers 410, rather than at the scoring/monitoring systems 422, with evaluation data being retrieved from the evaluation data store 408 to be used as a basis for generating the event data.

The event data store 412 may be used to populate a portion of a feature vector 440, which is provided as an input to one or more predictive models 436 of the model servers 430, as will be explained. For example, for a given student, the event data store may output one or more recent student response history scores 450, one or more recent student learning aid usage scores 452, one or more recent student time on task scores 454, an average item part score 456.

In some embodiments, multiple recent student response history scores 450 may be output by the event data store 412 to make up part of the feature vector 440, where each student response history score 450 is an indicator (i.e., "grade indicator") of whether a respective one of a predetermined number of the student's recent responses has been graded as correct or incorrect. For example, the predetermined number of the student's recent responses may be defined according to one of the following criteria: a number (e.g., 5) of most recent responses to item parts submitted by the student independent of which assessment those item parts correspond to, up to a number (e.g., 5) of the student's most recent responses to item parts within a particular assessment, or up to a number (e.g., 5) of the most recent responses to item parts submitted by the student within a predefined time period, such as an hour, a day or a week. In some embodiments, the student response history score 450 may be a single value that is determined via aggregation (e.g., averaging) of these grade indicators.

In some embodiments, multiple recent student learning aid usage scores 452 may be output by the event data store 412 to make up part of the feature vector 440, where each recent student learning aid usage score 452 is an indicator (i.e., "learning aid usage indicator") of learning aid usage corresponding to a respective one of a predetermined number of the student's recent responses. For example, each learning aid usage indicator may define whether a learning aid, such as a hint, was requested by the student between the time that the student was presented with a given item part and the time that the student submitted a correct response to the item part or gave up on answering the item part. In some embodiments, a given learning aid usage indicator may alternatively or additionally define a number of learning aids requested by the student when responding to a given item part (e.g., if multiple hints are available for that item part). For example, when generating the recent student learning aid usage scores 452, the event data store 412 may identify the student's recent responses according to one of the following criteria: a number (e.g., 5) of most recent responses to item parts submitted by the student independent of which assessment those item parts correspond to, up to a number (e.g., 5) of the student's most recent responses to item parts within a particular assessment, or up to a number (e.g., 5) of the most recent responses to item parts submitted by the student within a predefined time period, such as an hour, a day or a week. In some embodiments, the recent student learning aid usage scores 452 may be a single value that is determined via aggregation (e.g., averaging) of these learning aid usage indicators.

In some embodiments, multiple recent student time on task scores 454 may be output by the event data store 412 to make up part of the feature vector 440, where each recent student time on task score 452 is an indicator (i.e., "time on task indicator") of how long it took a student to submit a correct response (if any) to a respective one of a predetermined number of the student's recent responses. For example, each time on task indicator may be calculated as the difference between the time that the student was presented with a given item part and the time that the student submitted a correct response to the item part. In some embodiments, a given time on task indicator may alternatively or additionally define a total amount of time for which the student has been taking a given assessment (e.g., calculated as the time elapsed from the time the assessment began to a present time). For example, when generating the recent student time on task scores 454, the event data store 412 may identify the student's recent responses according to one of the following criteria: a number (e.g., 5) of most recent responses to item parts submitted by the student independent of which assessment those item parts correspond to, up to a number (e.g., 5) of the student's most recent responses to item parts within a particular assessment, or up to a number (e.g., 5) of the most recent responses to item parts submitted by the student within a predefined time period, such as an hour, a day or a week. In some embodiments, the student time on task scores 454 may be a single value that is determined via aggregation (e.g., averaging) of these time on task indicators.

The average item part score 456 for a given item part, may include an average grade for the item part. For example, the average grade may be calculated as an average of the grades (e.g., grades generated by scoring/monitoring systems 422) of responses submitted to that item part by any students who have submitted responses to that item part (e.g., within a predefined time frame or without time restriction). For example, the average item part score 456 may be the average grade for all responses submitted by students for item part. The average item part score may be output by the event data store to make up part of the feature vector 440. In some embodiments, the average item part score may instead or additionally include a median response time for the item part. For example, the median response time may be calculated as a median value response times of any students who have submitted responses to that item part (e.g., within a predefined time frame or without time restriction) when those students submitted responses to the item part. The response time may be defined as the elapsed time between the item part being displayed to the student and the student submitting a response to the item part. Alternatively, the response time may be defined as the elapsed time between the student submitting a response to a second item part immediately preceding the presently considered item part, and the student submitting a response to the presently considered item part (e.g., which may be modified if the student pauses or suspends the delivery of the assessment for embodiments where it is possible for the student to do so, the modification accounting for time spent in the suspended/paused state).

The model data store 409 may retrieve and store the outputs of one or more models of the model servers 430. In some embodiments, the model data store may also include model definitions to be used in the execution of one or more models (e.g., IRT model 432, short term prediction model 434, predictive models 436) by the model servers 430. For example, the model data store 409 may receive a request from the model servers 430 for one or more model definitions stored within the model data store 409, and may respond by outputting the requested model definitions to the model servers 430.

The IRT model 432 of the model servers 430 may be a 1-parameter (1PL) logistic model (e.g., the Rasch model), sometimes referred to herein as a "1PL IRT model." IRT is a technique by which, as applied here, the latent ability of individual students (e.g., which may be quantified as student ability values) within a population of students may be evaluated based on the performance of both the individual student and the group of students on a group of item parts. For example, the group of item parts may correspond to a defined hierarchical content level. For example, hierarchical content levels here refer to levels of an organizational system in which a given title/course may be organized into multiple chapters, each chapter including one or more sections, each section containing one or more assessments, and each assessment containing multiple items, and each item including one or more item parts. The IRT model further allows a quality of each item part of the group to be individually evaluated and quantified. The basic 1PL IRT model estimates the values of a single parameter (e.g., property) of an item part. The item response function of a 1PL IRT model based on an item part difficulty parameter is provided in Eq. 1:

$$P(Y = 1 \mid A, D) = \frac{1}{1 + e^{-(A-D)}} \quad \text{Eq. 1}$$

where P(Y=1|A,D) is the estimated probability, P, that a student will correctly respond to an item part on their first attempt (correct first attempt response being denoted as Y=1) given that the student has an estimated student ability value A and that the item part has a difficulty D. P is sometimes referred to herein as the "correct first try probability" or "correct first try probability score". The 1PL IRT model may be optimized to fit existing response data for the group of students and group of item parts. For example, the response data may include response scores (correct or incorrect) for all response submitted by students of the group of students to item parts of the group of item parts. The optimization of the 1PL IRT model may be performed using Maximum Likelihood Estimation (MLE), for example.

In the present example, the IRT model 432 may be used to estimate the difficulty (quantified as difficulty values) of each item part in a group of item parts corresponding to a given title, and to estimate the student ability values of individual students of a group of students who have submitted responses to the item parts of the group of item parts. For example, a given difficulty value may be defined as the student ability value at which a student is estimated to have a 50% probability of answering the item part correctly on their first attempt. Additionally, correct first try probability score may be generated for a student of the group of students who has not yet submitted a response to an item part of the group of item parts using the IRT model 432 (e.g., using Eq. 1) based on that student's ability score and the difficulty score of the given item part. As indicated above, the correct first try probability score is an estimate of the probability that a given student will answer a given item part correctly on their first attempt.

Outputs of the IRT model 432 may be stored in the model data store 409. These outputs may include item part difficulty scores for each item part in a given title, student ability scores for each student in a group of students who has submitted at least one response to at least one item part of the given title, and correct first try probability scores for each student in the group of students for each item part that the student has not yet submitted a response to.

An item part difficulty score 442 for a given item part may be calculated using the IRT model 432 based on response data retrieved from the evaluation data store 408, stored in the model data store 409, and output by the model data store 409 to be included in the feature vector 440.

A student ability score 444 for a given student may be calculated using the IRT model 432 based on response data retrieved from the evaluation data store 408, stored in the model data store 409, and output by the model data store 409 to be included in the feature vector 440.

A correct first try probability score for the given student and the given item part may be generated using the IRT model 432 based on the item part difficulty score 442 and the student ability score 444, stored in the model data store 409, and output by the model data store 409 to be included in the feature vector 440. The correct first try probability score may be an estimated probability that the given student will correctly answer the given item part on their first attempt.

It should be understood that while the IRT model 432 has been described in the present example in the context of a 1 PL IRT model, in alternative embodiments, the IRT model could be a 2 parameter or 3 parameter IRT model.

The short term prediction model 434 may generate a short term prediction score 448. The short term prediction score may be an estimate of whether the student will correctly respond to the given uncompleted item part of the assessment on their first attempt, and is unique in that it is generated based only on historical performance of other students who progressed through the assessment in a similar order as that of the student presently taking the assessment.

For example, to generate the short term prediction score 448, the short term prediction model 434 may identify already-answered item parts (e.g., item parts that the student has already submitted responses to) of the assessment being delivered to the student, and may identify an order in which the already-answered item parts were answered by and/or presented to the student. The short term prediction model 434 may identify, based on the historical student activity data, a group of other students who have previously completed the assessment, and who answered the already-answered item parts of the assessment in the same order as the student. To generate a short term prediction score for the student and a given uncompleted item part of the assessment (e.g., an item part that the student has not yet responded to), the short term prediction model 434 may determine an average of the grades achieved by the group of students when responding to the given uncompleted item part of the assessment on their respective first attempts, and may derive the short term prediction score based on this average.

The auxiliary features 457 may be optionally included in the feature vector 440 and may be derived from any data store included in the data store servers 410 (e.g., or the data store servers 300 of FIG. 3). For example, the auxiliary features 457 may include, but are not limited to, a student's average number of attempts made before correctly responding to item parts (e.g., which may be limited to item parts most recently responded to by the student or which may encompass all item parts of the title or other hierarchical content level that the student has submitted responses to, visual data corresponding to the student (e.g., eye tracking data, affect data), physiological data corresponding to the student (e.g., heartbeat of the student, cortisol levels of the student), historical student performance data (e.g., average of the response scores for responses submitted by the student to a particular element of hierarchical content, average of response scores for responses submitted by the student over a given time period, such as during a previous semester, average of response scores for all responses submitted by the student, or other applicable historical student performance data). In some embodiments, the auxiliary features 457 may further include the geographical location of the student (e.g., which may be determined based on IP geolocation), course-level information, instructor information, the time at which the current assessment is being delivered to the student, and/or times at which other assessments were historically delivered to the student.

The feature vector 440 may be provided as an input to the one or more predictive models 436 of the model servers 430. The predictive models 436 may include statistical models or machine learning models, which may be linear regression models, artificial neural networks, support vector machine regression models, random forest models, Naïve Bayes models, AdaBoost models, Boosting Tree models, or other applicable models.

In the example of neural networks, a neural network model may include various components configured to generate and manage artificial neural network data structures used to perform decision-making and/or predictive analyses based on entity data received by the neural network (e.g., from data stores 409, 408, 412 and/or from data stores 301-314 of FIG. 3). Such neural network data structures may be designed, constructed, and trained by adaptive learning processes to analyze complex sets of inputs (e.g., one or more sets of evaluation data, event data, and/or model data) and provide predictive outputs (e.g., student outcome prediction 458) corresponding to the expected risk that a student corresponding to the data input to the neural network model will fail to achieve an expected outcome (e.g., the expected outcome being correctly answering a particular item part on their first attempt, correctly answering more than a predetermined percentage of remaining item parts of an assessment being delivered to the student, passing a test or course, completing a homework assignment, being in the top 90% or other predefined percentage of a class of students, or other applicable expected outcomes).

The predictive model(s) 436 may generate a student outcome prediction 458. In some embodiments, the student outcome prediction 458 may be a binary value, indicating simply whether the student is "at risk" or "not at risk" of an undesirable outcome (e.g., not completing a homework assignment, not completing a course, not correctly responding to a predetermined percentage of remaining item parts of an assessment being delivered to the student, failing an assessment, failing a course, being in the bottom 10% or other predetermined percentage of a class of students, or other applicable undesirable outcomes). In embodiments where the predictive model 436 is a machine learning model, the particular outcome predicted via the student outcome prediction 458 may depend on how the predictive model 436 is trained. For example, the student outcome prediction 458 may predict a student's risk of failing a given assessment if the predictive model 436 used to generate the student outcome prediction 458 has been trained to predict risk of assessment failure (e.g., by minimizing an associated loss function during training). In some embodiments, the student outcome prediction 458 may include a prediction of a grade/score that the student will achieve for a particular item part, item, assessment, and/or course, may include a prediction of whether the student will request a hint for a particular item part, may include a prediction of the number of attempts the student will make to respond to a particular item part before submitting a correct response to the item part, and/or may include a prediction of the response time of the student when responding to a particular item part.

As an illustrative example, when an assessment is being delivered to a student, the student outcome prediction 458 generated for the student may initially include predictions of whether the student will correctly respond to each item part of the assessment. As the student progresses through the assessment (e.g., progression being marked by "completion" of assessment items, defined here as submitting correct responses or the maximum allowed number of attempted responses to assessment items of the assessment), student outcome prediction 458 may be re-calculated by the predictive models 436, as the data of the feature vector 440 will generally be updated as the student submits responses to the assessment. For example, once the student has completed one item part, the predictive models 436 may re-calculate the student outcome prediction 458, which may, at that iteration, include predictions of whether (e.g., binary value) or how likely (e.g., percent likelihood) it is that the student will correctly respond to each remaining item part of the assessment. For example, the student outcome prediction 458 may be recalculated each time the student submits a response to an item part of the assessment and/or may be recalculated each time the student completes an item part of the assessment. As will be described, each time the student outcome prediction 458 is recalculated, assessment of the student outcome prediction 458 may be performed, which may result in one or more predefined actions being taken by the system (e.g., automatic remediation initiation, remediation recommendation, updating the order in which the items of the assessment are delivered, etc.).

Figure 5:
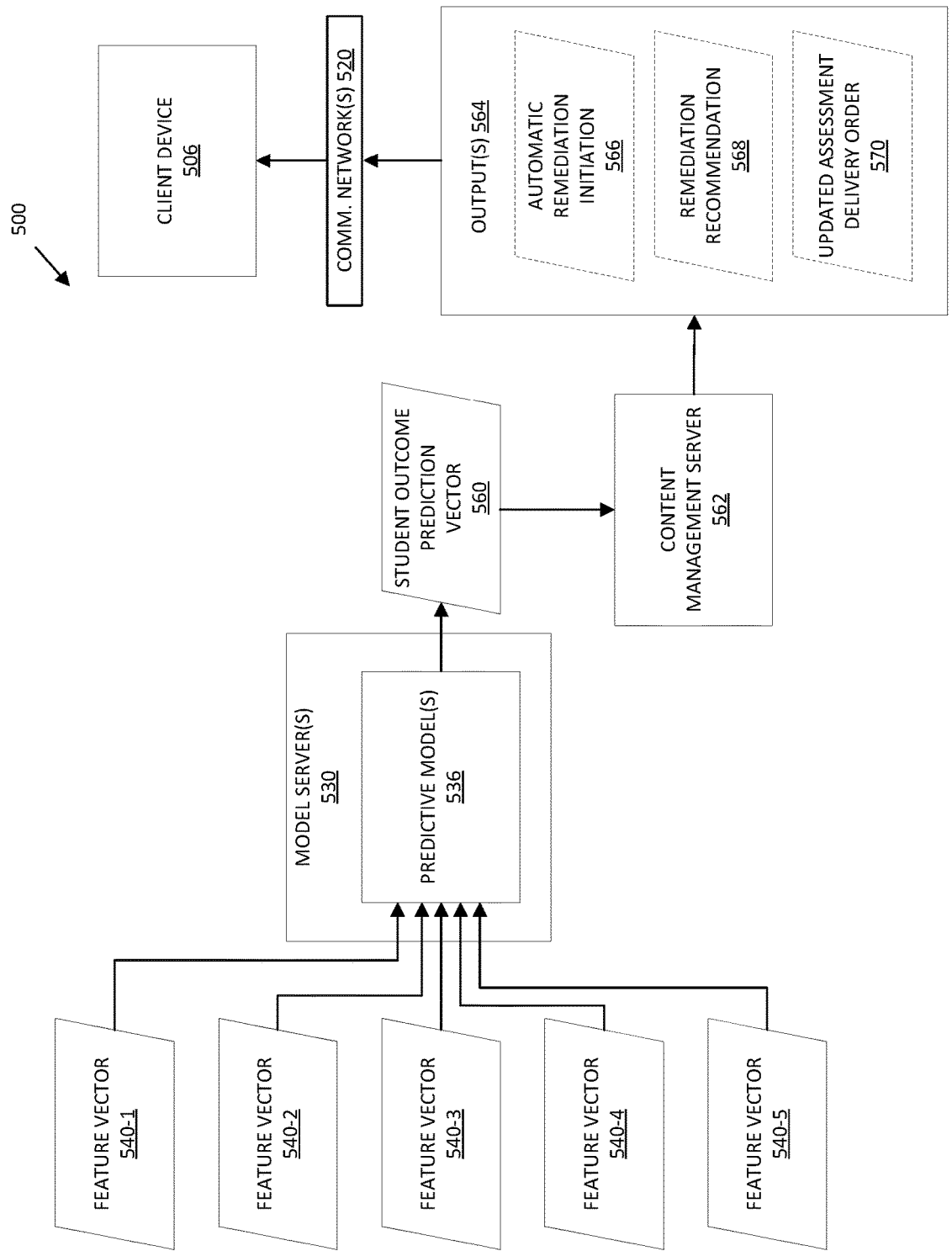
FIG. 5 illustrates a computing environment in which multiple feature vectors that include data related to a student and an assessment being taken by the student are processed by one or more predictive models to produce a student outcome prediction vector, which, when processed by a content management server may result in remediation being initiated at a client device at which the assessment is being delivered or may result in a delivery order of the assessment being modified by the content management server, in accordance with an embodiment.

FIG. 5 shows an illustrative system 500 that may predict when a student is "at risk" (e.g., struggling, at risk of failing an assessment, and/or at risk of incorrectly responding to one or more items of an assessment) during delivery of an assessment being delivered at a client device 506 (e.g., client device 106, 406, FIGS. 1, 4).

Feature vectors 540 (e.g., feature vector 440 of FIG. 4) may be generated based on event data, model data, and/or evaluation data output by a data store server (e.g., data store server 300, 410, FIGS. 3, 4), as described above. The feature vectors 540 may be input to one or more predictive models 536 (e.g., predictive model(s) 436 of FIG. 4) that are executed and/or stored on model servers 530 (e.g., model server(s) 430 of FIG. 4) of the system 500. In the present example, five feature vectors 540 are shown, but it should be understood that more or fewer feature vectors 540 may be input to the predictive models 536.

In one illustrative example, each of the feature vectors 540 may correspond to a single given student to which an assessment is being delivered, and may respectively correspond to different assessment items of the assessment. For example, feature vector 540-1 may correspond to the given student and a first item part of the assessment, feature vector 540-2 may correspond to the given student and a second item part of the assessment, and so on. The predictive models 536 may process each of the feature vectors 540 separately generate a separate student outcome predictions for each of the feature vectors 540. Each student outcome prediction may define whether the given student is expected to correctly respond to a corresponding item part of the assessment. For example, a given student outcome prediction may be a binary value that is a "1" if the student is predicted to correctly respond to the corresponding item part, and may be a "0" if the student is predicted to incorrectly respond to the item part, or vice-versa. As another example, a given student outcome prediction may be a percentage (e.g., a confidence percentage) representing a confidence level that the student will correctly or incorrectly respond to the corresponding item part. The collection of student outcome predictions generated in this way may collectively form a student outcome prediction vector 560.

The student outcome prediction vector 560 may be sent by the model servers 530 to a content management server 562 of the system 500. The content management server may analyze the student outcome prediction vector 560 to identify whether predetermined actions should be taken to intervene in the delivery of the assessment. For example, if more than a predetermined percentage of the item parts represented in the student outcome prediction vector 560 predict (e.g., by virtue of being a binary value associated with expected failure or of being a confidence percentage that is less than a predefined threshold) that the given student will respond incorrectly to the corresponding item parts of the assessment, then a predefined action may be taken by the content management server 562. In some embodiments, the particular predefined action taken by the content management server 562 may be dependent on the percentage or number of student outcome predictions of the vector 560.

For example, if the student outcome prediction vector 560 indicates that at least a first threshold percentage (e.g., 90%) of the uncompleted item parts of the assessment will be responded to incorrectly by the given student, then the content management server 562 may generate an output 564 corresponding to an automatic remediation initiation 566 or corresponding to a remediation recommendation 568. For example, if the student outcome prediction vector indicates that more than or equal to a second threshold percentage (e.g., 50%) and less than the first threshold percentage of the uncompleted item parts of the assessment will be responded to incorrectly by the given student, then the content management server 562 may generate an output 564 corresponding to an updated assessment delivery order 570. For example, if the student outcome prediction vector indicates that less than the second threshold percentage of the uncompleted item parts of the assessment will be responded to incorrectly by the given student, then the content management server 562 may not generate outputs 564, and delivery of the assessment may continue uninterrupted. The outputs 564 may be sent to the client device 506 from the content management server 562 via one or more communication networks 520 (e.g., communication networks 120, 420, FIGS. 1, 4), which may include one or more Local Area Networks, Wide Area Networks, and/or the internet.

Automatic remediation initiation 566 corresponds to an output of the content management server 562 sent to the client device 506, which may cause the client device 506 to automatically end or temporarily suspend the assessment being delivered to the given student, and to initiate remediation of the given student at the client device 506 (e.g., showing a video lecture, requiring that the given student complete a remediation exercise, presenting the student with relevant sections of an electronic textbook, or other applicable forms of remediation). In some embodiments, initiation of the remediation activity may interrupt, at least temporarily, the assessment being delivered at the client device 506. In some embodiments, automatic remediation initiation 566 may be selectively enabled or disabled by the given student or by an instructor for the given student (e.g., as part of a configuration associated with a user profile of the student). If automatic remediation initiation 566 is disabled when it would otherwise have been activated, the content management server may instead output a remediation recommendation 568.

The remediation recommendation 568 corresponds to an output of the content management server 562 sent to the client device 506, which may cause the client device 506 to provide (e.g., display) optional recommendations to the given student, suggesting ways in which the given student may improve their understanding of material covered in the assessment, such as watching a video lecture, completing a remediation activity (e.g., a homework assignment, an exercise, a prerequisite activity, or an electronically guided and/or interactive learning activity), or reading one or more relevant sections of a textbook covering material of the assessment and/or of particular item parts of the assessment that the given student is expected to respond incorrectly to. In some embodiments, the remediation recommendation 568 may be issued by the content management server 562 when automatic remediation initiation is disabled.

The updated assessment delivery order 570 corresponds to an output of the content management server 562 sent to the client device 506, which may cause the order in which the item parts of the assessment are being delivered at the client device 506 to be modified. For example, an assessment delivery order may be defined for the assessment, which specifies the order in which each remaining item part of the assessment will be delivered. The content management server may modify the assessment delivery order such that item parts for which the given student is expected to submit a correct response (based on the student outcome prediction vector 560) are delivered before item parts for which the given student is expected to submit an incorrect response. This may help to prevent the student from getting frustrated by more difficult questions or questions that they cannot correctly answer before they are given the opportunity to respond to easier questions or questions that they can correctly answer. By preventing or delaying student frustration in this way, student engagement may be better maintained.

Figure 6:
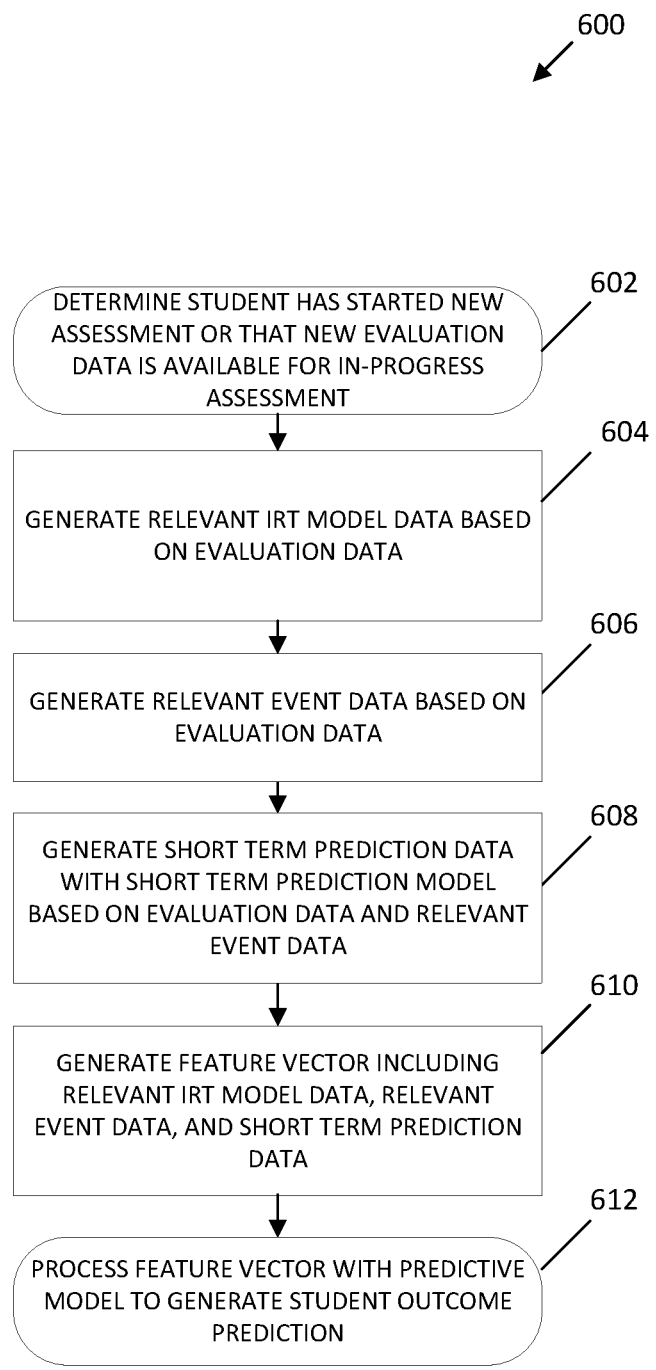
FIG. 6 shows an illustrative process flow for a method of generating and collecting data related to a student and an assessment being delivered to the student to form a feature vector, and processing the feature vector with a trained predictive model to generate a student outcome prediction, in accordance with an embodiment.

FIG. 6 shows a process flow for an illustrative method 600 by which a student outcome prediction may be generated for a given student and a given assessment item. Generally, the method 600 may be performed by executing computer-readable instructions with one or more processors of one or more computer systems.

For example, the method 600 may be performed using the system 400 of FIG. 4. One or more scoring and/or monitoring systems (e.g., scoring/monitoring systems 422 of FIG. 4) may include one or more processors that monitor student activity (e.g., student submission of responses to item parts of assessments, student utilization of hints or other learning aids, student time on task, etc.) occurring at a client device (e.g., client 106, 406, 506, FIGS. 1, 4, 5) based on information received from the client device via one or more electronic communication networks (e.g., communication networks 120, 420, 520, FIGS. 1, 4, 5) to produce student activity data, which be categorized as evaluation data. Student activity data retrieved as a result of this monitoring may be stored in one or more data stores (e.g., evaluation data store 408 and/or event data store 412, FIG. 4) of one or more data store servers (e.g., data store servers 300, 410, FIGS. 3, 4). Secondary ("event") data may be generated based on the student activity data as well as historical data (e.g., of the evaluation data store) related to past activity of the student and/or related to item parts of the assessment being delivered to the student. This event data may be stored in an event data store (e.g., event data store 412, FIG. 4) of the data store servers.

One or more model servers (e.g., model servers 430, 530, FIGS. 4, 5) may include one or more processors that execute models such as IRT models, short term predictive models, and/or other predictive models (e.g., IRT model 432, short term prediction model 434, and predictive models 436, FIG. 4). These models may operate on inputs that can include the student activity data, the historical data, and/or the event data. Results output by the IRT model and short term prediction model may be stored as model data on a model data store (e.g., model data store 409, FIG. 4) of the one or more data store servers.

The one or more data store servers may output a feature vector based on relevant data (e.g., relevant to a given student and a given item part of an assessment being delivered to the given student) that includes some or all of the model data, the student activity data, the historical data, and the event data. For example, the feature vector (e.g., feature vector 440, FIG. 4) may include an item part difficulty score for the item part, a student ability score for the student, a correct first try probability score for the student and the item part, a short term prediction score for the student and the item part, a recent student response history score for the student, a recent student learning aid usage score for the student, a recent student time on task score for the student, an average item part score for the item part, (e.g., scores 442-456, FIG. 4) and/or other applicable auxiliary features (e.g., auxiliary features 457 of FIG. 4) that may be retrieved from the data store servers. The predictive model, when executed, may process the feature vector to produce a student outcome prediction (e.g., student outcome prediction 458, FIG. 4), which may indicate whether the student is expected to correctly respond to the item part on their first attempt.

At step 602, the one or more scoring/monitoring systems may determine that a student has started a new assessment, or that new evaluation data (e.g., new student activity data) is available for an in-progress assessment being delivered to the student, and may initiate the generation of a new student outcome prediction for an uncompleted item part of the assessment. For example, the scoring/monitoring system(s) may determine that new data is available for an in-progress assessment by determining that the student has submitted a response to an item part of the assessment. This response submission may create a need for a student outcome prediction for the uncompleted item part of the assessment to be updated.

At step 604, a processor of the model server(s) generates relevant IRT data based on the evaluation data. For example, the relevant IRT data may include an item part difficulty score for the uncompleted item part, a student ability score for the student, and a correct first try probability score that estimates the likelihood that the student will correctly respond to the item part on their first attempt.

At step 606, a processor of the data store server(s) generates relevant event data based on the evaluation data. For example, the relevant event data may include, but is not limited to, a recent student response history score for the student, a recent student learning aid usage score for the student, a recent student time on task score for the student, and an average item part score for the uncompleted item part.

At step 608, a processor of the model server(s) generates relevant short term prediction data based on the relevant event data and the evaluation data. For example, the short term prediction data may include a short term prediction score for the student, which estimates the likelihood that the student will correctly respond to the uncompleted item part on their first attempt based on "recent" activity of the student (e.g., responses) and on observed outcomes for other students determined to be "similar" to the student. For example, to generate the short term prediction score, the short term prediction model may identify already-answered item parts (e.g., item parts that the student has already submitted responses to) of the assessment being delivered to the student, and may identify an order in which the already-answered item parts were answered by and/or presented to the student. The short term prediction model may identify, based on the historical student activity data, a group of other students who have previously completed the assessment, and who answered the already-answered item parts of the assessment in the same order as the student. To generate a short term prediction score for the student and a given uncompleted item part of the assessment (e.g., an item part that the student has not yet responded to), the short term prediction model may determine an average of the grades achieved by the group of students when responding to the given uncompleted item part of the assessment on their respective first attempts, and may derive the short term prediction score based on this average.

At step 610, a processor of either the model server(s) or the data store server(s) creates a feature vector that includes the relevant IRT model data, the relevant short term prediction data, and the relevant event data.

At step 612, a processor of the model server(s) applies a predictive model (e.g., predictive model 436 of FIG. 4) to the feature vector to generate a student outcome prediction. The student outcome prediction may, for example, be stored in the model data store of the model server(s), or may be sent (e.g., directly or as part of a student outcome prediction vector such as vector 560 of FIG. 5) to a content management server (e.g., content management server 562 of FIG. 5), where it may be relied upon as a basis for whether and/or what kind of intervention should be performed at the client device at which the assessment is being delivered to the student.

Figure 7:
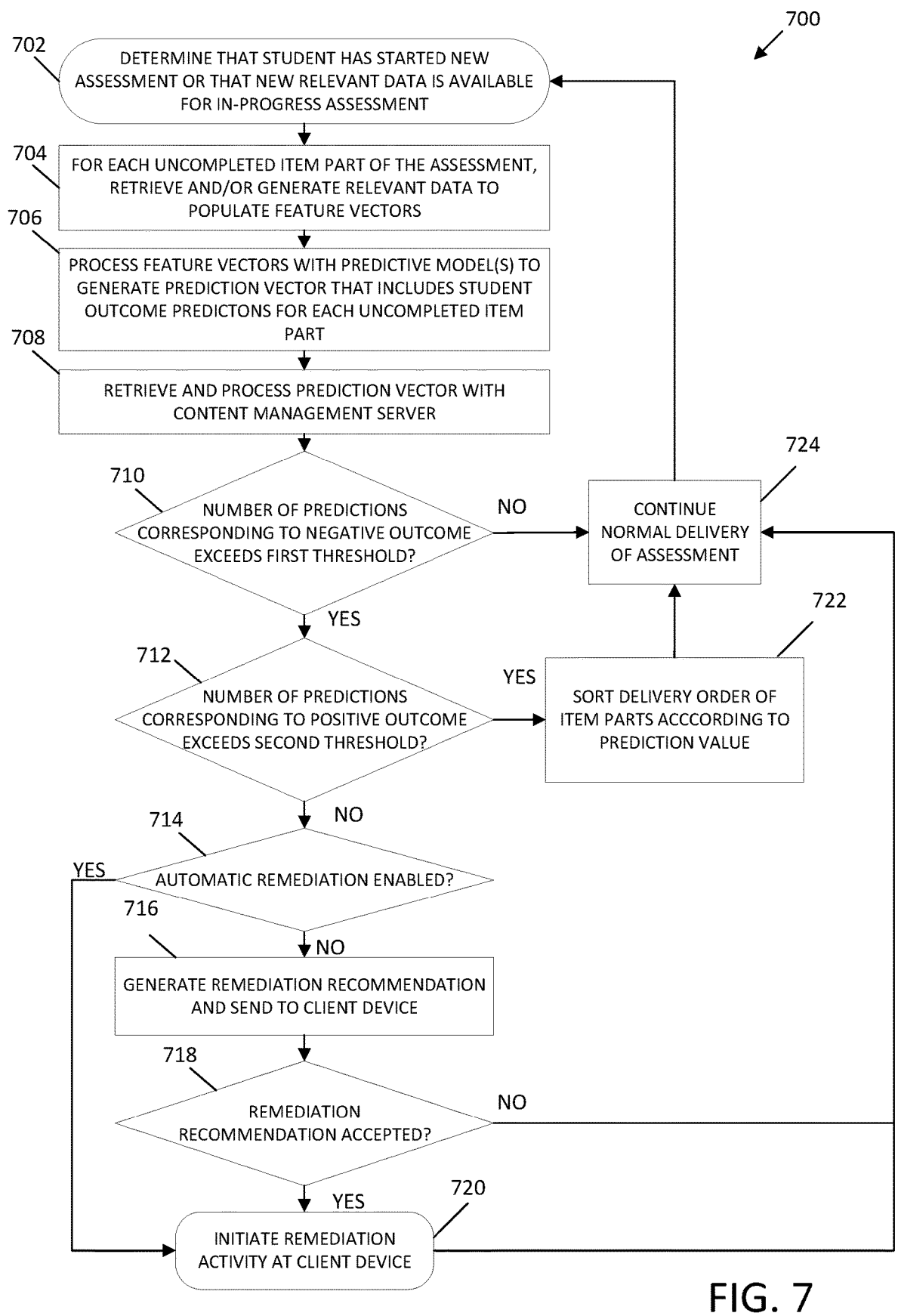
FIG. 7 shows an illustrative process flow for a method of processing generating feature vectors for each uncompleted item part of an assessment being delivered to a student, processing the feature vectors with one or more trained predictive models to generate a prediction vector of student outcome predictions, and initiating or recommending remediation at a client device at which the assessment is being delivered or modifying a delivery order of the assessment, in accordance with an embodiment.

FIG. 7 shows a process flow for an illustrative method 700 by which intervention may be performed by a content management server during delivery of an assessment to a student based on one or more student outcome predictions. Generally, the method 700 may be performed by executing computer-readable instructions with one or more processors of one or more computer systems.

For example, the method 700 may be performed using the system 500 of FIG. 5. One or more data store servers (e.g., data store servers 300, 410, FIGS. 3, 4) may output multiple feature vectors (e.g., feature vectors 540, FIG. 5) based on respective sets relevant data (e.g., relevant to a given student and a given item part of an assessment being delivered to the given student). For example, each feature vector may be generated according to the method 600 of FIG. 6. Each feature vector may relate to a single student and a respectively different uncompleted item part of an assessment being delivered to that student. Each feature vector may include model data, student activity data, historical data, and/or event data related to the individual student and/or the respective uncompleted item part associated with that feature vector. For example, a given feature vector may include an item part difficulty score for its associated item part, a student ability score for the student, a correct first try probability score for the student and its associated item part, a short term prediction score for the student and its associated item part, a recent student response history score for the student, a recent student learning aid usage score for the student, a recent student time on task score for the student, an average item part score for the item part, (e.g., scores 442-456, FIG. 4) and/or other applicable auxiliary features (e.g., auxiliary features 457 of FIG. 4) that may be retrieved from the data store servers.

One or more model servers may receive the feature vectors from the data store server(s) and may provide the feature vectors as inputs to one or more predictive models (e.g., predictive models 536 of FIG. 5) being executed by one or more processors of the one or more model servers. When executed, the predictive model or models may process the feature vectors to produce a student outcome prediction vector (e.g., student outcome prediction vector 560 of FIG. 5), which may include multiple student outcome predictions (e.g., student outcome prediction 458, FIG. 4). Each student outcome prediction may indicate whether the student is expected to correctly respond to an item part associated with that student outcome prediction on their first attempt.

A content management server (e.g., content management server 562 of FIG. 5) may receive and analyze the student outcome prediction vector from the model servers 530. For example, the content management server may determine which student outcome prediction vectors correspond to expectations that the student will correctly respond to associated, uncompleted item parts of the assessment on their first attempt (i.e., a positive outcome) and which student outcome prediction vectors correspond to expectations that the student will incorrectly respond to associated, uncompleted item parts of the assessment on their first attempt (i.e., a negative outcome). For example, student outcome predictions with a value exceeding a predetermined outcome threshold may be determined by the content management server to correspond to a positive outcome, while those not exceeding the predetermined outcome threshold may be determined to correspond to a negative outcome.

If the content management server determines that the prediction vector includes student outcome predictions corresponding to both positive and negative outcomes, the content management server may intervene in delivery of the assessment by re-arranging an order in which item parts of the assessment are to be delivered (i.e., assessment delivery order), such that item parts associated with predictions of positive outcomes are to be delivered before item parts associated with predictions of negative outcomes. If the content management server determines that the prediction vector includes only student outcome predictions corresponding to negative outcomes, the content management server may intervene in delivery of the assessment by causing the client device at which the assessment is being delivered to either recommend that the student engage in one or more remediation activities or by automatically initiating such remediation activities (e.g., depending on whether automatic remediation is enabled in the user profile of the student or in a configuration of the course/title that includes the assessment being delivered).

At step 702, a processor of a content management server (e.g., content management server 562 of FIG. 5) may determine that a given student has started a new assessment or that new evaluation data is available for an in-progress assessment being delivered to the student. For example, the processor of the content management server may receive an indication from a scoring/monitoring system (e.g., scoring/monitoring systems 422 of FIG. 4), which may monitor student activity occurring at a client device at which the assessment is being delivered to the student. The indication may specify that the student has started a new assessment or that the new evaluation data is available for the in-progress assessment. In the case of an in-progress assessment, the scoring/monitoring system may determine that new evaluation data is available each time a response is submitted by the student to an item part of the assessment and each time the student requests/accesses a learning aid while taking the assessment.

At step 704, a processor of the model server may retrieve and/or generate relevant data (e.g., IRT model data, short term prediction data, event data, and/or evaluation data) to populate feature vectors (e.g., feature vectors 440, 540, FIGS. 4, 5). A respective feature vector may be generated for each uncompleted item part of the assessment. For example, the processor of the model server may be instructed by the processor of the content management server to retrieve and generate the relevant data and populate the feature vectors in response to the processor of the content management server determining that the student has started a new assessment or that new evaluation data is available for an in-progress assessment.

At step 706, the processor of the model server processes the feature vectors with one or more predictive models (e.g., predictive models 436, 536, FIGS. 4, 5) to generate a student outcome prediction vector (e.g., student outcome prediction vector 560, FIG. 5) that includes student outcome predictions for each uncompleted item part of the assessment.

At step 708, the processor of the content management server retrieves the student outcome prediction vector from the model server, and processes the student outcome prediction vector. For example, in processing the student outcome prediction vector, the content management server may identify which student outcome predictions correspond to positive outcomes and which student outcome predictions correspond to negative outcomes by comparing each prediction to a positive outcome threshold and/or a negative outcome threshold (e.g., with predictions above the positive outcome threshold being associated with positive outcomes, and predictions below the negative outcome threshold being associated with negative outcomes). In some embodiments, the positive and negative outcome thresholds may be equal, while in other embodiments, the positive and negative outcome thresholds may be different such that some predictions may not be associated with positive or negative outcomes (i.e., they are neutral).

At step 710, the processor of the content management server compares the number of predictions of the student outcome prediction vector corresponding to negative outcomes (sometimes referred to as "negative outcome predictions") to a first threshold. If the number of negative outcome predictions exceeds the first threshold, the method 700 proceeds to step 712. Otherwise, the method 700 proceeds to step 724 and normal delivery of the assessment continues until new relevant data is made available or the assessment being delivered ends.

At step 712, the processor of the content management server compares the number of predictions of the student outcome prediction vector corresponding to positive outcomes (sometimes referred to as "positive outcome predictions") to a second threshold. If the number of positive outcome predictions exceeds the second threshold, the method 700 proceeds to step 722. Otherwise the method 700 proceeds to step 714.

At step 722, in response to determining that the number of negative outcome predictions exceeds the first threshold and the number of positive outcome predictions exceeds the second threshold, the processor of the content management server may sort or otherwise rearrange a delivery order of uncompleted item parts of the assessment based on the values of the student outcome predictions associated with each uncompleted item part (e.g., with item parts associated with positive outcome predictions being delivered to the student before any other item parts). For example, if both of the first and second thresholds are exceeded, this generally indicates that uncompleted item parts exist in the assessment that the student is likely to answer incorrectly on their first attempt, but that other uncompleted item parts exist in the assessment that the student is likely to answer correctly on their first attempt. Thus, in order to keep the student engaged, prevent student frustration, and facilitate learning of the student, the original delivery order of the uncompleted item parts may be rearranged by the content management server so that uncompleted item parts associated with positive outcomes (based on the corresponding student outcome predictions) are presented to the student during delivery of the assessment before the student is presented with uncompleted item parts associated with negative or neutral outcomes. The processor of the content management server may send the updated delivery order to the client device at which the assessment is being delivered, which may implement the updated delivery order to replace the original delivery order.

At step 714, the processor of the content management server may determine whether automatic remediation is enabled for the assessment and/or for the student. In some embodiments, the content management server processor may additionally or alternatively determine whether automatic remediation is disabled for the assessment and/or for the student. For example, the content management server processor may analyze configuration settings for a user profile of the student and/or for the assessment in order to determine whether automatic remediation is enabled for either or both. If automatic remediation is enabled for either or both of (e.g., and/or if automatic remediation is not disabled for both of) the student and the assessment, the method 700 proceeds to step 720. If automatic remediation is not enabled for both (e.g., and/or if automatic remediation is disabled for either) the student and the assessment, the method 700 proceeds to step 716.

At step 716, the processor of the content management server generates a remediation recommendation for the student, and causes the remediation recommendation to be displayed at the client device. For example, the remediation recommendation may include remediation activities such as instructional videos and lectures that the student may watch or other instructional course material related to content of the assessment. Other remediation activities may include remedial exercises and/or interactive content related to the assessment, which may cover concepts that are prerequisite for understanding concepts covered in the assessment.

At step 718, the processor of the content management server may receive an indication from the client device, specifying that the remediation recommendation has been accepted or has not been accepted. If accepted, the method 700 proceeds to step 720. Otherwise, the method 700 proceeds to step 724 and normal delivery of the assessment continues.

At step 720, a remediation activity is initiated at the client device. For example, the remediation activity may include watching a video lecture, completing a homework assignment, an exercise, a prerequisite learning activity (e.g., designed to re-teach foundational concepts that may support the student's understanding of the content covered in the assessment), or an electronically guided and/or interactive learning activity, or reading one or more relevant sections of a textbook related to material covered in the assessment and/or in particular item parts of the assessment.

In some embodiments, the particular remediation activity to be initiated at step 720 may be generated/selected using a remediation algorithm (e.g., executed by the processor of the content management server or by a processor of another computer system coupled to the content management server and/or the client device). The remediation algorithm may output a remediation activity tailored to a particular student's situation, for example, based on the recent student activity of that student, the assessment currently being delivered to the student, and/or course material of the course in which the student is presently enrolled that has yet to be completed by the student (e.g., assessments that the student is expected to take in the future). In other embodiments, student may be prompted to seek remediation directly from their instructor, rather than the remediation activity being delivered via the client device. In still other embodiments, one or more predetermined remediation activities may be defined (e.g., in a memory device of the content management server) for a particular course and/or assessment, which may be delivered to the student via the client device at step 720.

In the present example, once the remediation activity is completed by the student, the method 700 proceeds to step 724 and normal delivery of the assessment continues.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system comprising:
a scoring and monitoring system configured to monitor student activity occurring at a client computer device to generate student activity data, the student activity corresponding to delivery of an assessment to a student;
a data store server comprising at least one data store and being coupled to the scoring and monitoring system, wherein the data store server receives the student activity data from the scoring and monitoring system and stores the student activity data in the at least the data store server, wherein the at least one data store includes:
an evaluation data store that stores evaluation data, wherein the evaluation data comprises the student activity data and historical student activity data associated with historical activity of the student and of other students;
an event data store that stores event data, the event data characterizing the evaluation data and being generated, at least in part, by the scoring and monitoring system based on the evaluation data; and
a model data store that stores the model data generated by the first predictive model, wherein the model data is further generated based on the historical student activity data; and
a model server coupled to the data store server, the model server comprising a model processor configured to:
execute a first predictive model to generate model data based at least on the student activity data;
generate a feature vector based on at least the student activity data and the model data; and
process the feature vector by executing a second predictive model to generate a student outcome prediction that estimates whether the student will correctly respond to an item part of the assessment on a first attempt, wherein the second predictive model is a machine learning model trained via an adaptive learning process using training data.

2. The system of claim 1, wherein the first predictive model comprises an item response theory model, and wherein the model data comprises:
an item part difficulty score for the item part of the assessment;
a student ability score for the student; and
a correct first try probability score that estimates the likelihood that the student will correctly respond to the item part on the first attempt based on the item part difficulty score and the student ability score.

3. The system of claim 2, wherein the model processor is further configured to:
execute a short term prediction model to generate a short term prediction score by:
identifying a first order in which the student has responded to already-answered item parts of the assessment based on the historical student activity data;
identifying grades for each of the already-answered item parts;
identifying a group of students of the other students, each student of the group of students having responded to the already-answered item parts in the first order when taking the assessment;
determining a first average of grades achieved by the group of students when first responding to the already-answered item parts; and
generating the short term prediction score based on the first average.

4. The system of claim 3, wherein the event data comprises:
a recent student response history score representing grades of responses submitted by the student within a predefined time window;
a recent student learning aid usage score representing learning aid usage of the student within the predefined time window;
a recent student time on task score representing an average time taken by the student to submit each of the responses within the predefined time window; and
an average item part score representing a second average grade achieved by a subset of the other students during their respective first attempts at responding to the item part.

5. The system of claim 4, wherein the feature vector comprises the item part difficulty score, the student ability score, the correct first try probability score, the short term prediction score, the recent student response history score, the recent student learning aid usage score, the recent student time on task score, and the average item part score.

6. The system of claim 5, wherein the second predictive model is selected from a group consisting of: a neural network model, a random forest model, a support vector machine, and a logistic regression model.

7. The system of claim 1, further comprising:
a content management server that receives the student outcome prediction from the model server and that is configured to:
perform a comparison of the student outcome prediction and at least one threshold; and
intervene in delivery of the assessment by sending an output to the client computer device.

8. The system of claim 7, wherein the output causes the client computer device to modify an order in which item parts of the assessment are delivered.

9. The system of claim 7, wherein the output causes the client computer device to interrupt the initiate a remediation activity selected from the group consisting of: performing a remediation exercise, displaying a video lecture, and performing a prerequisite learning activity.

10. A system comprising:
a data store server configured to store student activity data corresponding to delivery of an assessment to a student at a client device;
a model server configured to execute at least one predictive model to generate model data based on the student activity data, to generate feature vectors based on the student activity data and the model data, and to execute a machine learning model to generate a student outcome prediction vector; and
a content management server configured to:
determine that new student activity data is available at the data store;
cause the model server to execute the machine learning model in response to determining that the new student activity data is available at the data store;
receive the student outcome prediction vector from the model server, wherein the student outcome prediction vector comprises at least one student outcome prediction that estimates a likelihood that the student will correctly respond to an item part of the assessment during a first attempt;
analyze the student outcome prediction vector by
determining a first number of positive student outcome predictions of the student outcome prediction vector by comparing each student outcome prediction of the student outcome prediction vector to a positive outcome threshold;
determining a second number of negative student outcome predictions of the student outcome prediction vector by comparing each student outcome prediction of the student outcome prediction vector to a negative outcome threshold;
performing a first comparison of the first number to a first threshold; and
performing a second comparison of the second number to a second threshold; and
based on analyzing the student outcome prediction vector, intervene in the delivery of the assessment.

11. The system of claim 10, wherein to analyze the student outcome prediction vector, the content management server is further configured to:
determine, based on the second comparison, that the second number exceeds the second threshold;
determine, based on the first comparison, that the first number exceeds the first threshold; and
determine that automatic remediation is enabled for the student and the assessment.

12. The system of claim 11, wherein, to intervene in the delivery of the assessment, the content management server is configured to:
automatically cause an output to be sent to the client device, the output causing the client device to initiate a remediation activity, wherein the remediation activity interrupts delivery of the assessment.

13. The system of claim 10, wherein to analyze the student outcome prediction vector, the content management server is further configured to:
determine, based on the second comparison, that the second number exceeds the second threshold; and
determine, based on the first comparison, that the first number does not exceed the first threshold.

14. The system of claim 13, wherein, to intervene in the delivery of the assessment, the content management server is configured to:
- identify an original delivery order of uncompleted item parts of the assessment;
- generate an updated delivery order of the uncompleted item parts in which a first subset of the uncompleted item parts are to be delivered before a second of the uncompleted item parts, the first subset of the uncompleted item parts being associated with the positive student outcome predictions, and the second subset of uncompleted item parts being associated with the negative student outcome predictions; and
- send the updated delivery order to the client device to replace the original delivery order.

15. A method comprising:
- determining, by a content management server, that new student activity data is available at a data store, the new student activity data corresponding to delivery of an assessment to a student at a client device;
- causing, by the content management server, a model server to generate at least one feature vector in response to determining that the new student activity data is available;
- causing, by the content management server, the model server to execute a machine learning model to process the at least one feature vector to produce a student outcome prediction vector;
- receiving, by the content management server, the student outcome prediction vector from the model server, the student outcome prediction vector comprising at least one student outcome prediction that estimates a likelihood that the student will correctly respond to an item part of the assessment during an initial attempt;
- analyzing, by the content management server, the student outcome prediction vector, wherein analyzing the student outcome prediction vector includes:
  - determining a first number of positive student outcome predictions of the student outcome prediction vector by comparing each student outcome prediction of the student outcome prediction vector to a positive outcome threshold;
  - determining a second number of negative student outcome predictions of the student outcome prediction vector by comparing each student outcome prediction of the student outcome prediction vector to a negative outcome threshold;
  - performing a first comparison of the first number to a first threshold;
  - performing a second comparison of the second number to a second threshold;
  - determining, based on the second comparison, that the second number exceeds the second threshold; and
  - determining, based on the first comparison, whether the first number exceeds the first threshold; and
- intervening, by the content management server, in the delivery of the assessment in response to analyzing the student outcome prediction vector.

16. The method of claim 15 wherein causing the model server to generate the at least one feature vector comprises:
- causing the model server to execute an item response theory model to generate item response theory data;
- causing the model server to execute a short term prediction model to generate a short term prediction score; and
- causing the model server to retrieve event data from an event data store of the data store server, wherein the at least one feature vector includes the item response theory data, the short term prediction score, and the event data.

17. The method of claim 15, wherein analyzing the student outcome prediction vector comprises:
- determining, based on the first comparison, that the first number exceeds the first threshold; and
- determining that automatic remediation is enabled for the student and the assessment, wherein intervening in the delivery of the assessment comprises automatically causing an output to be sent to the client device, the output causing the client device to initiate a remediation activity, wherein the remediation activity interrupts delivery of the assessment.

18. The method of claim 15, wherein analyzing the student outcome prediction vector comprises:
- determining, based on the first comparison, that the first number does not exceed the first threshold.

19. The method of claim 18, wherein, intervening in the delivery of the assessment comprises:
- identifying an original delivery order of uncompleted item parts of the assessment;
- generating an updated delivery order of the uncompleted item parts in which a first subset of the uncompleted item parts are to be delivered before a second of the uncompleted item parts, the first subset of the uncompleted item parts being associated with the positive student outcome predictions, and the second subset of uncompleted item parts being associated with the negative student outcome predictions; and
- sending the updated delivery order to the client device to replace the original delivery order.

* * * * *